(12) United States Patent
Fasola et al.

(10) Patent No.: US 12,227,173 B2
(45) Date of Patent: Feb. 18, 2025

(54) SECONDARY FALLBACK SOFTWARE STACK FOR AUTONOMOUS VEHICLE

(71) Applicant: GM Cruise Holdings LLC, San Francisco, CA (US)

(72) Inventors: Juan Fasola, San Francisco, CA (US); Eugene Lo, Redwood City, CA (US); Xiaoyu Zhou, San Francisco, CA (US); Shreyans Kushwaha, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 226 days.

(21) Appl. No.: 17/841,494

(22) Filed: Jun. 15, 2022

(65) Prior Publication Data

US 2023/0406293 A1     Dec. 21, 2023

(51) Int. Cl.
*B60W 30/09* (2012.01)
*B60W 50/02* (2012.01)
*B60W 50/035* (2012.01)
*B60W 50/038* (2012.01)

(52) U.S. Cl.
CPC ........ *B60W 30/09* (2013.01); *B60W 50/0205* (2013.01); *B60W 50/035* (2013.01); *B60W 50/038* (2013.01)

(58) Field of Classification Search
CPC ............ B60W 30/09; B60W 50/0205; B60W 50/035; B60W 50/038; B60W 2050/0292; B60W 2050/0297; B60W 60/0015
See application file for complete search history.

(56) References Cited

U.S. PATENT DOCUMENTS

| | | | |
|---|---|---|---|
| 11,952,001 B1* | 4/2024 | Wang | G05B 17/02 |
| 2017/0341634 A1* | 11/2017 | Heise | B60T 13/662 |
| 2018/0259966 A1* | 9/2018 | Long | B60W 50/02 |
| 2019/0324475 A1* | 10/2019 | Dean | G05D 1/0278 |
| 2020/0148201 A1* | 5/2020 | King | G06N 20/00 |
| 2020/0189573 A1* | 6/2020 | King | G05D 1/0223 |
| 2022/0185339 A1* | 6/2022 | Chen | B60W 10/06 |
| 2023/0044157 A1* | 2/2023 | White | G01S 7/4817 |
| 2023/0060755 A1* | 3/2023 | Bharmal | B60W 10/20 |

* cited by examiner

*Primary Examiner* — Rami Khatib
(74) *Attorney, Agent, or Firm* — Dimitri Kirimis

(57) ABSTRACT

Systems and methods for a vehicle to use a fallback control system orthogonal to a primary control system are provided. A method includes collecting, by a fallback control system of a vehicle, sensor data generated by one or more sensors of the vehicle; determining, by the fallback control system using a first process different from a second process of a primary control system of the vehicle, an alternative action for the vehicle based on the sensor data; and sending, by the fallback control system based on the alternative action, an instruction for modifying an action associated with the primary control system upon a faulty condition associated with the primary control system.

8 Claims, 11 Drawing Sheets

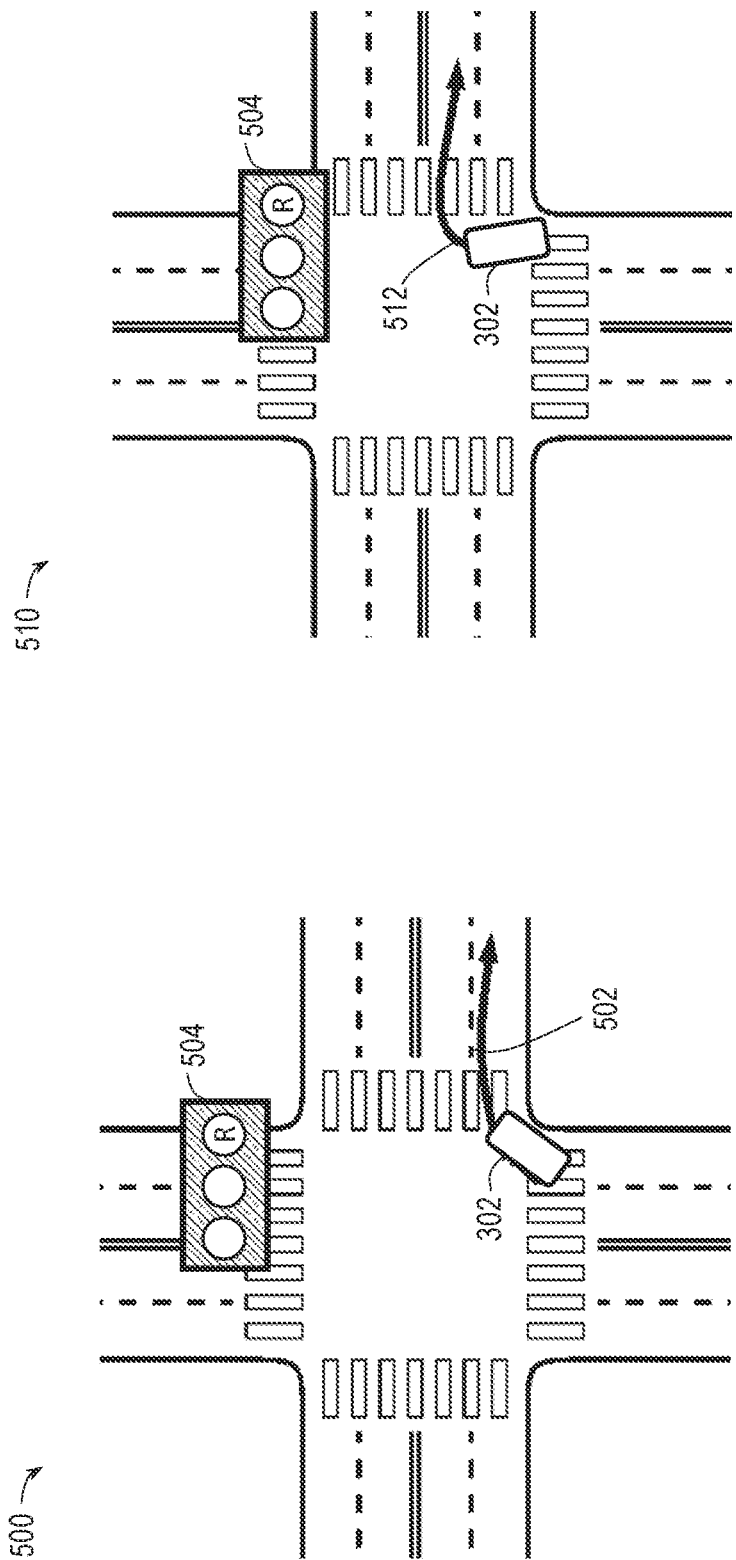

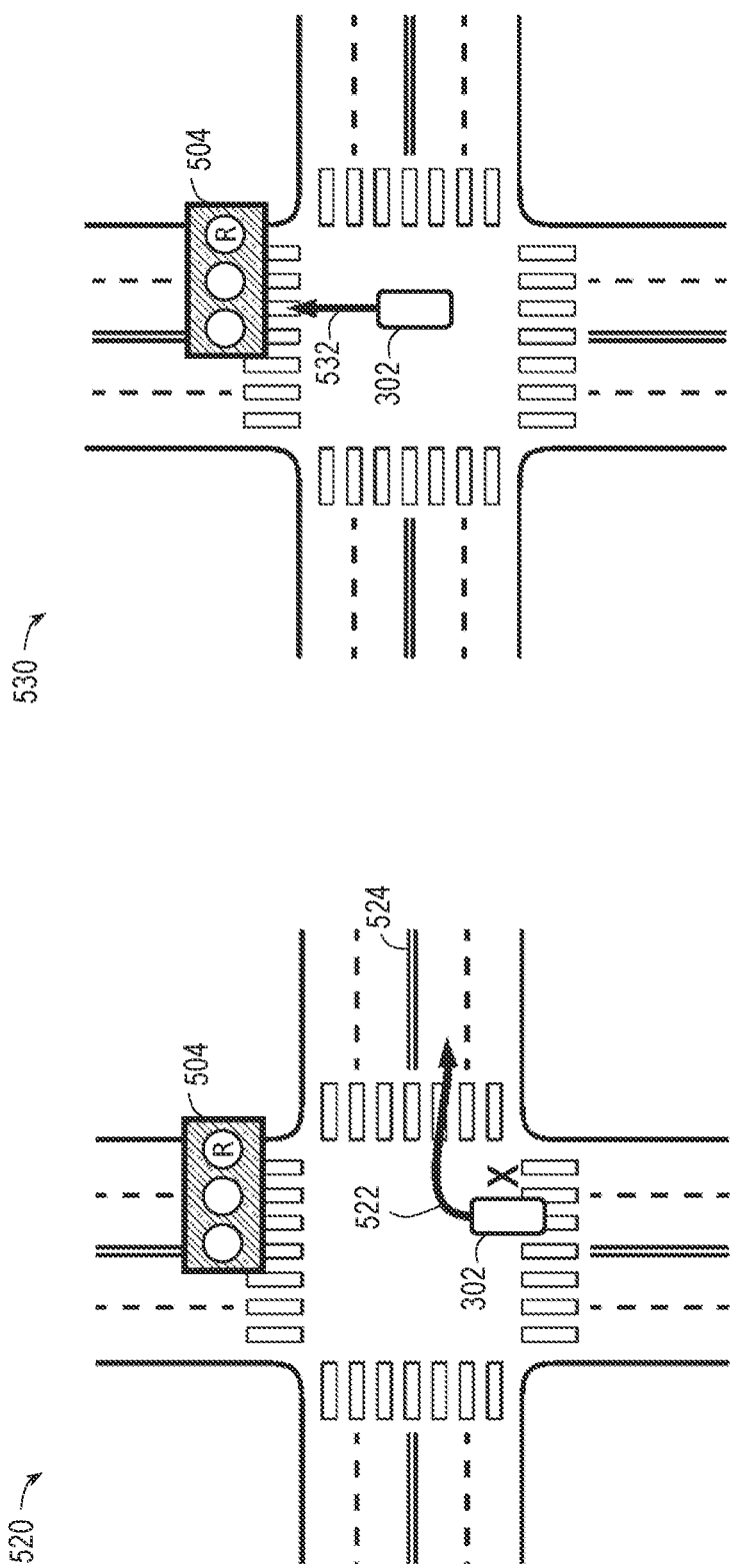

SECONDARY FALLBACK SOFTWARE STACK FOR AUTONOMOUS VEHICLE

TECHNICAL FIELD

The present disclosure relates generally to autonomous vehicles, and more particularly, to secondary fallback software stack (e.g., with fallback controls) for autonomous vehicles.

BACKGROUND

Autonomous vehicles, also known as self-driving cars, driverless vehicles, and robotic vehicles, may be vehicles that use multiple sensors to sense the environment and move without human input. Automation technology in the autonomous vehicles may enable the vehicles to drive on roadways and to accurately and quickly perceive the vehicle's environment, including obstacles, signs, and traffic lights. Autonomous technology may utilize map data that can include geographical information and semantic objects (such as parking spots, lane boundaries, intersections, crosswalks, stop signs, traffic lights) for facilitating the vehicles in making driving decisions. The vehicles can be used to pick up passengers and drive the passengers to selected destinations. The vehicles can also be used to pick up packages and/or other goods and deliver the packages and/or goods to selected destinations.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5A illustrates an exemplary scenario in which a fallback control system of an AV performs autonomous creeping after taking control of the AV, according to some embodiments of the present disclosure;

FIG. 5B illustrates an exemplary scenario in which a fallback control system of an AV performs autonomous creeping after taking control of the AV, according to some embodiments of the present disclosure;

FIG. 5C illustrates an exemplary scenario in which a fallback control system of an AV performs autonomous creeping after taking control of the AV, according to some embodiments of the present disclosure;

FIG. 5D illustrates an exemplary scenario in which a fallback control system of an AV performs autonomous creeping after taking control of the AV, according to some embodiments of the present disclosure;

DETAILED DESCRIPTION

Overview

Figure 1:
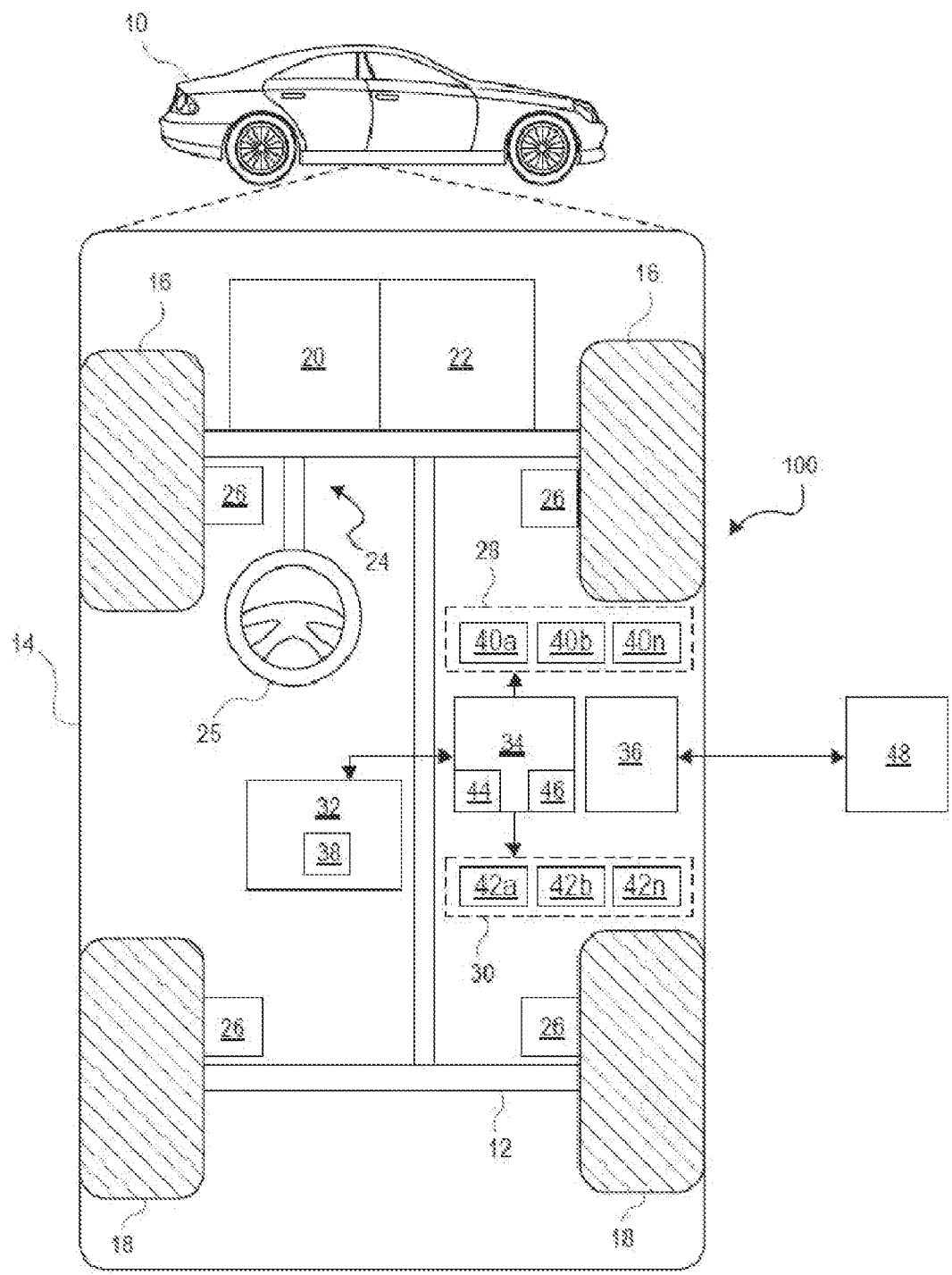
FIG. 1 illustrates an exemplary autonomous vehicle (AV) in which a primary control system and a fallback control system may be implemented, according to some embodiments of the present disclosure.

The systems, methods and devices of this disclosure have several innovative aspects, no one of which is solely responsible for the attributes disclosed herein. Details of one or more implementations of the subject matter described in this specification are set forth in the description below and the accompanying drawings.

Autonomous vehicles (AVs) can provide many benefits. For instance, AVs may have the potential to transform urban living by offering opportunity for efficient, accessible and affordable transportation. An AV may be equipped with various sensors to sense an environment surrounding the AV and collect information (e.g., sensor data) to assist the AV in making driving decisions. To that end, the collected information or sensor data may be processed and analyzed to determine a perception of the AV's surroundings, extract information related to navigation, and predict future motions of the AV and/or other traveling agents in the AV's vicinity. The predictions may be used to plan a path for the AV (e.g., from point A to point B). As part of planning, the AV may access map information and localize itself based on location information (e.g., from location sensors) and the map information. Subsequently, instructions can be sent to a controller to control the AV (e.g., for steering, accelerating, decelerating, braking, etc.) according to the planned path.

While an AV (or the AV compute system) may collect sensor data generated by its onboard sensors (e.g., cameras, light detection and ranging (LIDAR) sensors, radio detection and ranging (RADAR) sensors, etc.) and monitor a driving environment of the AV based on the sensor data, one or more of these sensors may fail at some point of time. For instance, the AV may rely on images provided by camera(s) for object and/or traffic event classification but the camera(s) may stop to operate (e.g., due to sensor hardware and/or software errors, bad lightings, bad weather conditions, etc.). Further, there may be corner cases that the perception, prediction, and/or planning algorithms implemented by the AV may not detect or unable to handle. For example, machine learning algorithms are commonly used for perception, prediction, and/or planning that facilitates an AV in make driving decisions. While machine learning algorithms can be used to determine a perception, a prediction, and/or a plan that may otherwise be difficult to interpret or solve using numerical analysis alone, the machine learning algorithms may rely heavily on the training data sets that were used to train the machine learning models (e.g., in performing perception, prediction, and/or control). The performance of perception, prediction, and/or planning using machine learning models may thus rely on the coverage of the training data sets in capturing real-world driving scenarios. In general, there may be scenarios where the AV is unable to respond (e.g., unable to calculate a path or make a driving decision). While the AV may request for remote assistance (e.g., from a human operator), there may be delays in obtaining response(s) from remote assistance. Further, in some instances, the AV may be unable to access remote assistance (e.g., due to a weak wireless communication link or being out of a wireless communication coverage area). Accordingly, it may be desirable to have fallback controls built into an AV to handle erroneous and/or faulty events independent of remote assistance.

The present disclosure describes mechanisms for providing fallback controls at a vehicle (e.g., an AV). In an aspect of the present disclosure, the vehicle may include a primary control system and a fallback control system orthogonal to the primary control system. The fallback control system may also be referred to as a secondary control system. As used herein, the orthogonality between the primary control system and the fallback control system may refer to algorithms, techniques, and/or processes (e.g., for perception, prediction, planning, collision detection, control, etc.) used by the fallback control system being different from (or nonoverlapping with) algorithms, techniques, and/or processes used by the primary control system. For instance, the primary control system may use machine learning algorithms, and the fallback control system may use heuristic algorithms that are based on rules, numerical solutions that are representable by mathematical equations, and can be interpreted and reasoned. The orthogonality between the primary control system and the fallback control system can minimize or avoid the primary control system and the fallback control system having the same faults and/or failing under the same conditions. That is, the fallback control system can provide algorithmic redundancy. Further, in some aspects, the orthogonality between the primary control system and the fallback control system can also be in terms of hardware. For instance, the fallback control system may include at least one processing component (e.g., a central processing unit (CPU), a graphical processing unit (GPU), etc.) that is not part of the primary control system. Furthermore, the fallback control system may utilize sensor data generated by different sensor(s) than sensor(s) that generate sensor data for the primary control system to provide further hardware redundancy.

Under a normal (or nominal) condition, the primary control system may control the vehicle based on the action(s) and the fallback control system may operate in a standby mode. Upon a detection of a faulty (or failure) condition at the primary control system, the fallback control system may take over the control of the vehicle. To that end, the primary control system may determine a first action for the vehicle based on first sensor data associated with a surrounding environment of the vehicle. The fallback control system may determine, independent of the primary control system, an alternative action for the vehicle based on second sensor data associated with the surrounding environment. The primary control system may determine the first action using a first process. The fallback control system may determine the alternative action using a second process different than (or orthogonal to) the first process. Each of the first process or the second process may include performing perception, prediction, and/or planning. In some aspects, the fallback control system may determine the alternative action concurrent (or simultaneously) with the primary control system determining the first action. In some aspects, it may be desirable for the fallback control system to bring the vehicle to a stop upon detecting a faulty condition (or failure) associated with the primary control system. Accordingly, the alternative action may include bringing the vehicle to a stop (e.g., decelerate at a comfortable speed and avoid other objects in the environment).

The vehicle may further include a path multiplexer that selects between the first action or the alternative action. For instance, if there is no faulty (or failure) condition associated with the primary control system detected, the path multiplexer may generate a control command for controlling the vehicle based on the first action. If, however, there is a faulty (or failure) condition associated with the primary control system detected, the path multiplexer may switch a control of the vehicle from the primary control system to the fallback control system, for example, by generating a control command for controlling the vehicle based on the alternative action. Stated differently, the path multiplexer can select to override or modify a control command based on the first action (from the primary control system) with a control command based on the alternative action (from the fallback control system) responsive to a faulty (or failure) condition associated with the primary control system.

In some aspects, the second sensor data used by the fallback control system to determine the alternative action may be a subset of the first sensor data used by the primary control system to determine the first action, where the subset is less than all of the first sensor data. For instance, the first sensor data may include image data from cameras, point clouds from LIDAR sensors, whereas the second sensor data may include the point clouds (LIDAR data) but not the image data. In other aspects, the second sensor data may be separate from the first sensor data. For instance, the vehicle may further include one or more first sensors to generate the first sensor data for the primary control system and one or more second sensors, separate from the one or more first sensors, to generate the second sensor data for the fallback control system (e.g., for example, to provide sensor hardware redundancy).

In some aspects, the primary control system may determine the first action using machine learning while the fallback control system may determine the alternative action using heuristic-based rules. In some aspects, the primary control system may determine the first action by computing a path for the vehicle based on a first set of constraints (e.g., planning constraints) while the fallback control system may determine the alternative action by computing an alternative path for the vehicle based on a second set of constraints (e.g., planning constraints) different from the first set of constraints. For instance, the second set of constraints may be less stringent and/or may include a fewer number of constraints than the first set of constraints. In some aspects, the primary control system may compute the path using a non-convex solver (NCS) while the fallback control system may compute the alternative path using free space planning. Free space planning may refer to planning a path for the vehicle traversing across areas that are identified as unoccupied by any object and can be independent of one or more lane limitations (e.g., can traverse cross any lane). Free space planning may generally be not as structured or restrictive as the planning at the primary control system. In some aspects, the primary control system may determine the first action by selecting the first action from a full set of candidate actions while the fallback control system may determine the alternative action by selecting the alternative action from a reduced set of candidate actions.

In some aspects, after the fallback control system takes control of the vehicle and brings the vehicle to a stop, the vehicle may stop at an area that fails to satisfy one or more criteria. For example, the vehicle may stop at a high-risk area, such as in an intersection, an oncoming traffic lane, an emergency driveway, etc., that may obstruct other traffic or prone to cause a collision. Accordingly, it may be desirable for the fallback control system to be able to automatically detect the high-risk area and plan a path to bring the vehicle to a nearest feasible low risk location. To that end, the fallback control system may determine a collision-free path for the vehicle to maneuver away from the high-risk area. As part of determining the collision-free path, the fallback control system may determine candidate exit roads, each including one or more exit lanes, filter the candidate exit lanes based on one or more exit criteria, and select an exit road or lane from the filtered candidate exit lanes for the vehicle to drive away from the high-risk area. The fallback control system automatically or autonomously initiating a maneuver of the vehicle away from a high-risk area may be referred to as autonomous creeping. In some aspects, the fallback control system may also use free space planning for autonomous creeping.

The systems, schemes, and mechanisms described herein can provide several benefits. For example, using a fallback control system that is orthogonal to a primary control system at a vehicle can minimize the dependencies between the fallback control system and the primary control system. Thus, when the primary control system fails, the fallback control system can provide fallback or backup driving decisions and/or controls. Further, having the fallback control system not only bring the vehicle to a stop but also automatically detect for a high-risk area and maneuver the vehicle out of the high-risk area can further reduce obstruction, reduce interruption to other traffic participants, and/or the likelihood of causing a collision.

Example AV

FIG. 1 illustrates an exemplary AV 10 in which a primary control system and a fallback control system may be implemented, according to some embodiments of the present disclosure.

As depicted in FIG. 1, the AV 10 may generally include a chassis 12, a body 14, front wheels 16, and rear wheels 18. The body 14 may be arranged on the chassis 12 and encloses components of the AV 10. The body 14 and the chassis 12 may jointly form a frame. The front wheels 16 and rear wheels 18 may be rotationally coupled to the chassis 12 near a respective corner of the body 14. In some examples, the chassis 12 may differ from the chassis on which the sensor arrays are mounted. For example, the sensor arrays can be mounted on the roof of the AV 10.

In various embodiments, the AV 10 may be an AV and the system 100 and/or components thereof may be incorporated into the AV 10. The AV 10 may be, for example, a vehicle that may be automatically controlled to carry passengers and/or cargo from one location to another. While the AV 10 may be depicted as a passenger car in FIG. 1, any other vehicle, including motorcycles, trucks, sport utility vehicles (SUVs), recreational vehicles (RVs), marine vessels, aircraft, and the like, can also be used as an AV.

In an example, the AV 10 may correspond to a level four or level five automation system under the Society of Automotive Engineers (SAE) "J3016" standard taxonomy of automated driving levels. Using this terminology, a level four system may indicate "high automation," referring to a driving mode in which the automated driving system performs aspects of the dynamic driving task, even if a human driver does not respond appropriately to a request to intervene. A level five system may indicate "full automation," referring to a driving mode in which the automated driving system performs aspects of the dynamic driving task under roadway and environmental conditions that can be managed by a human driver. Implementations in accordance with the present subject matter are not limited to any taxonomy or rubric of automation categories. Furthermore, systems in accordance with the present disclosure can be used in conjunction with any autonomous or other vehicle that utilizes a navigation system and/or other systems to provide route guidance.

As shown, the AV 10 may generally include a propulsion system 20, a transmission system 22, a steering system 24, a brake system 26, a sensor system 28, an actuator system 30, data storage device 32, controller 34, and a communication system 36. The propulsion system 20 can, in various embodiments, include an internal combustion engine, an electric machine such as a traction motor, and/or a fuel cell propulsion system. The transmission system 22 may be configured to transmit power from the propulsion system 20 to the front wheels 16 and rear wheels 18 according to selectable speed ratios. According to various implementations, the transmission system 22 can include a step-ratio automatic transmission, a continuously-variable transmission, or other appropriate transmission.

The brake system 26 may be configured to provide braking torque to the front wheels 16 and rear wheels 18. Brake system 26 can, in various embodiments, include friction brakes, brake by wire, a regenerative braking system such as an electric machine, and/or other appropriate braking systems.

The steering system 24 may influence a position of the front wheels 16 and/or rear wheels 18. While depicted as including a steering wheel 25 for illustrative purposes, in some embodiments contemplated within the scope of the present disclosure, the steering system 24 may not include a steering wheel.

The sensor system 28 may include one or more sensing devices 40a-40n that sense observable conditions of the exterior environment and/or the interior environment of the AV 10. The sensing devices 40a-40n can include RADAR sensors, LIDAR sensors, global positioning systems (GPSs), optical cameras, thermal cameras, time-of-flight (TOF) cameras, ultrasonic sensors, speedometers, compasses, and/or other sensors.

The actuator system 30 may include one or more actuator devices 42a-42n that control one or more vehicle features such as the propulsion system 20, the transmission system 22, the steering system 24, and the brake system 26. In various embodiments, the AV 10 can also include interior and/or exterior vehicle features not illustrated in FIG. 1, such as various doors, a trunk, and cabin features such as air conditioning, music players, lighting, touch-screen display components (such as those used in connection with navigation systems), and the like.

The data storage device 32 may store data for use in automatically controlling the AV 10. In various implementations, the data storage device 32 may store defined maps of the navigable environment. In various implementations, the defined maps may be predefined by and obtained from a remote system. For example, the defined maps may be assembled by the remote system and communicated to the AV 10 (wirelessly and/or in a wired manner) and stored in the data storage device 32. Route information can also be stored within the data storage device 32—i.e., a set of road segments (associated geographically with one or more of the defined maps) that together define a route that the user might take to travel from a start location (e.g., the user's current location) to a target location. Also, in various implementations, the data storage device 32 may store ML models 38 that are trained for identifying objects from sensor data captured by the sensor system 28.

In general, the data storage device 32 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any data storage devices or memory elements discussed herein should be construed as being encompassed within the broad term "memory." As will be appreciated, the data storage device 32 can be part of the controller 34, separate from the controller 34, or part of the controller 34 and part of a separate system.

The controller 34 may include a processor 44 and a computer-readable storage device or media 46. The processor 44 can be any custom-made or commercially available processor, a CPU, a GPU, an auxiliary processor among several processors associated with the controller 34, a semiconductor-based microprocessor (in the form of a microchip or chip set), any combination thereof, or generally any device for executing computer instructions. The computer-readable storage device or media 46 can include volatile and non-volatile storage in ROM, RAM, and keep-alive memory (KAM), for example. KAM may be a persistent or non-volatile memory that can store various operating variables while the processor 44 is powered down. The computer-readable storage device or media 46 can be implemented using any of a number of memory devices such as PROMs (programmable read-only memory), EPROMs (electrically PROM), EEPROMs (electrically erasable PROM), flash memory, or any other electric, magnetic, optical, resistive, or combination memory devices capable of storing data, some of which represent executable instructions, used by the controller 34 in controlling the AV 10. As will be appreciated, while the computer-readable storage device or media 46 is depicted in FIG. 1 as part of the controller 34, the computer-readable storage device or media 46 can be part of the data storage device 32.

The instructions can include one or more separate programs that comprise an ordered listing of executable instructions for implementing logical functions. The instructions, when executed by the processor 44, can receive and process signals from the sensor system 28, perform logic, calculations, methods and/or algorithms for automatically controlling the components of the AV 10, and generate control signals transmitted to the actuator system 30 to control the components of the AV 10 based on the logic, calculations, methods, and/or algorithms. Although one controller 34 is shown in FIG. 1, embodiments of the AV 10 can include any number of controllers 34 that communicate over any suitable communication medium or a combination of communication mediums and that cooperate to process the sensor signals, perform logic, calculations, methods, and/or algorithms, and generate control signals to control features of the AV 10.

In some embodiments, as will be discussed in detail below, the AV 10 may include an AV control system (e.g., the AV control system 200 of FIG. 2). The AV control system may include a primary control system and a fallback control system orthogonal to the primary control system. The controller(s) 34 can be part of the primary control system and/or the fallback control system. The primary control system may implement a primary AV software stack (e.g., including perception, prediction, planning, etc.) stored as instructions and executed by the controller(s) 34. In a similar way, the fallback control system may implement a secondary fallback AV software stack (e.g., including perception, prediction, planning, etc.) stored as instructions and executed by the controller(s) 34. Under a normal (or nominal) condition, the primary control system may control the AV 10 and the fallback control system may operate in a standby mode (e.g., determining actions for the AV 10 but without controlling the AV 10). Upon a detection of a faulty (or failure) condition at the primary control system, the fallback control system may take over the control of the AV 10. In some aspects, the same controller(s) 34 may be used by the primary control system and the fallback control system. In other aspects, the fallback control system may use at least one controller 34 that is not used by the primary control system (e.g., to provide hardware redundancy).

The communication system 36 may wirelessly communicates information to and from other entities 48, such as other vehicles ("V2V" communication), infrastructure ("V2I" communication), remote transportation systems, and/or user devices. In an example, the communication system 36 may be a wireless communication system configured to communicate via a wireless local area network (WLAN) using IEEE (Institute of Electrical and Electronics Engineers) 802.11 standards or by using cellular data communication (e.g., fifth-generation (5G) under the third Generation Partnership Project (3GPP)). Additional or alternate communication methods, such as a dedicated short-range communications (DSRC) channel, may also considered within the scope of the present disclosure. DSRC channels may refer to one-way or two-way short-range to medium-range wireless communication channels specifically designed for automotive use and a corresponding set of protocols and standards.

Example AV Control System

Figure 2:
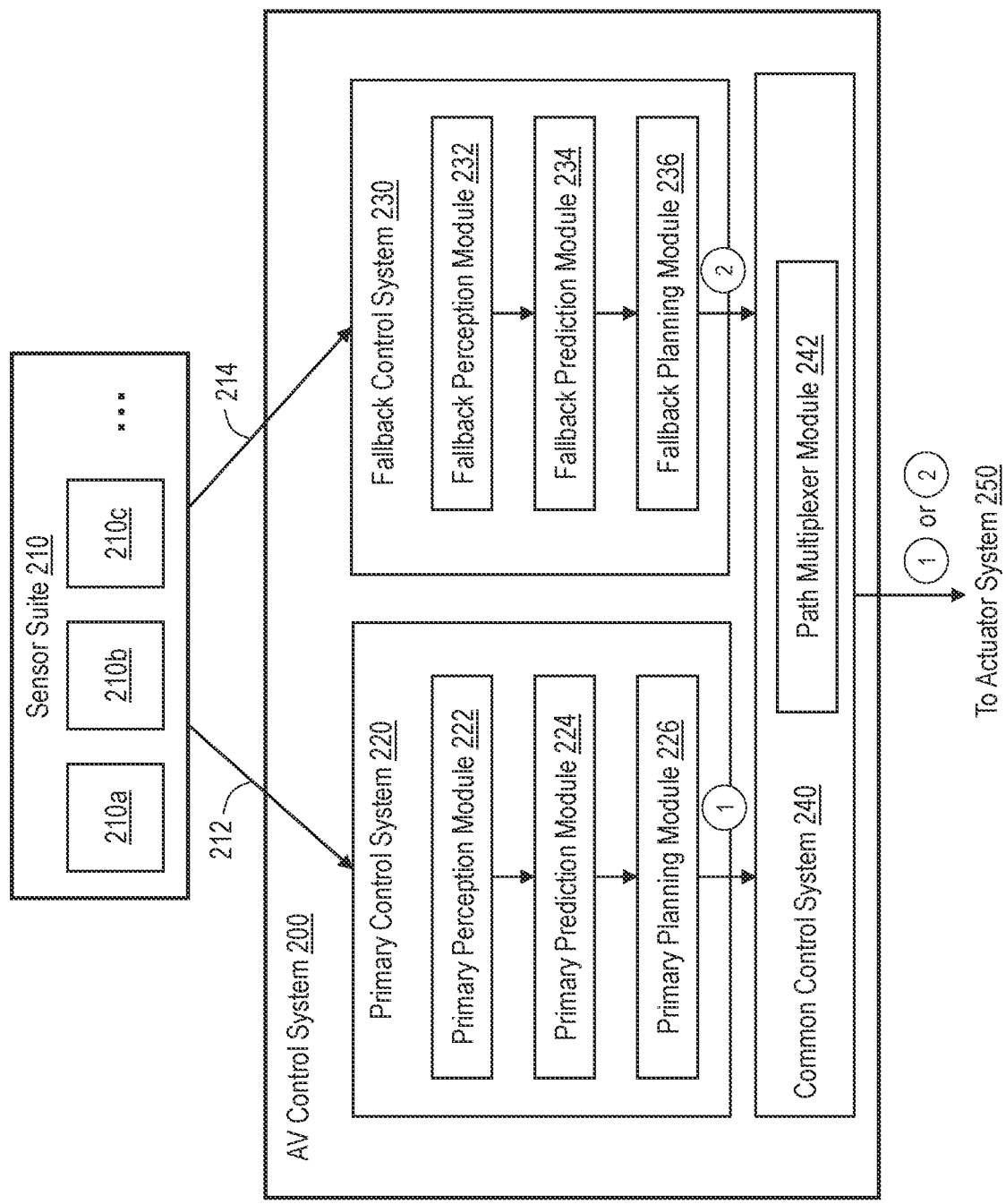
FIG. 2 is a block diagram illustrating an exemplary AV control system including a primary control system and a fallback control system, according to some embodiments of the present disclosure.

FIG. 2 is a block diagram illustrating an exemplary AV control system 200 including a primary control system 220 and a fallback control system 230 orthogonal to the primary control system 220, according to some embodiments of the present disclosure. The AV control system 200 may be implemented by an AV such as the AV 10 of FIG. 1. At a high level, under a normal (or nominal) condition, the primary control system 220 may control the AV and the fallback control system may operate in a standby mode (e.g., without controlling the AV). Upon a detection of a faulty (or failure) condition at the primary control system 220, the fallback control system 230 may take over the control of the AV.

As shown in FIG. 2, the AV control system 200 may receive sensor data from a sensor suite 210 of the AV. More specifically, the primary control system 220 may receive first sensor data 212 from the sensor suite 210, and the fallback control system 230 may receive second sensor data 214 from the sensor suite 210. The sensor suite 210 may be similar to the sensor system 28 of the AV 10. For instance, the sensor suite 210 may include a variety of sensors, which may broadly categorize into a computer vision ("CV") system, localization sensors, and driving sensors. In particular, the sensor suite 210 may include one or more vision sensors 212a (e.g., camera sensors). The one or more vision sensors 212a may capture images of the surrounding environment of the AV. For instance, the one or more vision sensors 212a may capture images of various objects such as trees, road signs, the traffic lights, buildings, objects, etc. in an environment of the AV. In some instances, the sensor suite 210 may include multiple vision sensors 212a to capture different views, e.g., a front-facing camera, a back-facing camera, and side-facing cameras. In some instances, one or more vision sensors may be implemented using a high-resolution imager with a fixed mounting and field of view. One or more vision sensors 212a may have adjustable field of views and/or adjustable zooms. In some embodiments, the vision sensors 212a may capture images continually or at some intervals during operation of the AV. The vision sensors 212a may transmit the captured images (as part of first sensor data 212) to the primary control system 220 for further processing, for example, to assist the AV 110 in determining certain action(s) to be carried out by the AV.

Additionally or alternatively, the sensor suite 210 may include one or more LIDAR sensors 212b. The one or more LIDAR sensors 212b may measure distances to objects in the vicinity of the AV using reflected laser light. The one or more LIDAR sensors 212b may include a scanning LIDAR that provides a point cloud of the region scanned. The one or more LIDAR sensors 212b may have a fixed field of view or a dynamically configurable field of view. The one or more LIDAR sensors 212b may produce a point cloud (e.g., a collection of data points in a 3D space) that describes the shape, contour, and/or various characteristics of one or more object in the surrounding of the AV and a distance of the object away from the AV. For instance, the point cloud may include data points representing various objects such as trees, road signs, the traffic lights, buildings, objects, etc. in an environment of the AV. The one or more LIDAR sensors 212b may transmit the captured point cloud (as part of first sensor data 212) to the primary control system 220 for further processing, for example, to assist the AV in determining certain action(s) to be carried out by the AV.

Additionally or alternatively, the sensor suite 210 may include one or more RADAR sensors 212c. RADAR sensors 212c may operate in substantially the same way as LIDAR sensors 212b, but instead of the light waves used in LIDAR sensors, RADAR sensors use radio waves (e.g., at frequencies of 24, 74, 77, and 79 gigahertz (GHz)). The one or more RADAR sensors 212c may transmit the captured RADAR data (as part of first sensor data 212) to the primary control system 220 for further processing. For example, the time taken by the radio waves to return from the objects or obstacles to the AV is used for calculating the distance, angle, and velocity of the obstacle in the surroundings of the AV.

Additionally or alternatively, the sensor suite 210 may include one or more location sensors. The one or more location sensors may collect data that is used to determine a current location of the AV. The location sensors may include a GPS sensor and one or more inertial measurement units (IMUS). The one or more location sensors may further include a processing unit (e.g., a component of an onboard computer of the AV, or a separate processing unit) that receives signals (e.g., GPS data and IMU data) to determine the current location of the AV. The location determined by the one or more location sensors can be used for route and maneuver planning. The location may also be used to determine when to capture images of a certain object. The location sensor may transmit the determined location information to the primary control system 220 for further processing, for example, to assist the AV in determining certain action(s) to be carried out by the AV.

In general, the sensor suite 210 may include any suitable sensors including but not limited to, photodetectors, one or more cameras, RADAR sensors, sound navigation and ranging (SONAR) sensors, LIDAR sensors, GPS, wheel speed sensors, weather sensors, IMUs, accelerometers, microphones, strain gauges, pressure monitors, barometers, thermometers, altimeters, etc. The sensors may be located in various positions in and around the AV. Further, the sensors suite 210 may also transmit sensor data (the second sensor data 214) to the fallback control system 230 for fallback operations as will be discussed more fully below.

As further shown in FIG. 2, the AV control system 200 may include a common control system 240 in communication with the primary control system 220 and the fallback control system 230. The primary control system 220 may determine a first action for the AV based on the first sensor data 212, and the fallback control system 230 may determine an alternative action for the AV based on the second sensor data 214. The fallback control system 230 may determine the alternative action for the AV simultaneously with the primary control system 220 determining the first action, and the common control system 240 may select between the first action or the alternative action depending on the operational state of the primary control system 220.

For example, under a normal (or nominal) condition, the common control system 240 may listen to the primary control system 220 and generate control command(s) and/or parameter(s) according to the first action (determined by the primary control system 220) and send the control command(s) and/or parameter(s) to an actuator system 250 (e.g., the actuator system 30) the of the AV as shown by the circle with the numeral 1. That is, while the fallback control system 230 may determine the alternative action in parallel with the primary control system 220 determining the first action, the fallback control system 230 operates in a standby mode (e.g., without controlling the AV) under the normal condition. If, however, the primary control system 220 experiences a failure or faulty event, the common control system 240 may switch to listen to the fallback control system 230 and generate control commands or control parameters according to the alternative action (determined by the fallback control system 230) and send control commands and/or parameters to the actuator system 250 of the AV as shown by the circle with the numeral 2.

As further shown in FIG. 2, the primary control system 220 may include a primary perception module 222, a primary prediction module 224, and a primary planning module 226, each of which may be implemented using any suitable combination of hardware and/or software component(s). For example, the primary perception module 222, the primary prediction module 224, and the primary planning module 226 may coordinate with each other to determine a first action for the AV.

More specifically, the primary perception module 222 may analyze the received sensor data (e.g., camera images, point clouds, location information, etc.) provided by the sensor suite 210 and output an understanding or a perception of the environment surrounding the AV. In particular, the primary perception module 222 may extract information related to navigation and making driving decisions. For instance, the primary perception module 222 may detect objects such as other cars, pedestrians, trees, bicycles, and objects traveling on or near the roadway systems on which the AV traveling, and indications surrounding the AV (such as construction signs, traffic cones, traffic lights, stop indicators, and other street signs). In some examples, the primary perception module 222 may include one or more classifiers trained using machine learning to identify particular objects. For example, a multi-class classifier may be used to classify each object in the environment of the AV as one of a set of potential objects, e.g., a vehicle, a pedestrian, or a cyclist. As another example, a pedestrian classifier may recognize pedestrians in the environment of the AV, a vehicle classifier may recognize vehicles in the environment of the AV, etc.

The primary prediction module 224 may perform predictive analysis based on at least some of the recognized objects or perception provided by the primary perception module 222, e.g., to determine projected pathways of other vehicles, bicycles, and pedestrians. The primary prediction module 224 may also predict the AV's future trajectories, which may enable the AV to make appropriate navigation decisions. In some examples, the primary prediction module 224 may include one or more prediction models trained using machine learning to determine future motions and/or trajectories of other traffic agents and/or of the AV itself.

The primary planning module 226 may plan maneuvers for the AV based on map data, data received from the primary perception module 222, prediction information received from the primary prediction module 224, and navigation information, e.g., a route instructed by a fleet management system. In some examples, the primary planning module 226 may receive map data from a map database (e.g., stored locally at the AV or at a remote server) including data describing roadways (e.g., locations of roadways, connections between roadways, roadway names, speed limits, traffic flow regulations, toll information, etc.), buildings (e.g., locations of buildings, building geometry, building types), and other objects (e.g., location, geometry, object type). In some instances, the map database may further include data describing other features, such as bike lanes, sidewalks, crosswalks, traffic lights, parking lots, etc. In general, a map database may include data describing any known, relatively fixed features and/or objects in a geographical area. In some examples, the primary planning module 226 may receive data from the primary perception module 222 describing at least some of the features described by the map data in the environment of the AV. The primary planning module 226 may compare map data with data from the primary perception module 222 to confirm the accuracy of the map data and to determine the precise positions of perceived objects on the map.

The primary planning module 226 may determine a pathway for the AV to follow based on the perception(s) and/or the prediction(s), for example, a route from point A to point B. When the primary perception module 222 detects moving objects in the environment of the AV, the primary planning module 226 may determine the pathway for the AV based on predicted behaviors of the objects provided by the primary prediction module 224 and right-of-way rules that regulate behavior of vehicles, cyclists, pedestrians, or other objects. The pathway may include locations for the AV to maneuver to, and timing and/or speed of the AV in maneuvering to the locations. In some aspects, as part of determining the pathway for the AV, the primary planning module 226 may utilize an NCS. An NCS may utilize a graph solver to generate collision-free trajectories for the vehicle with suitable risk and comfort qualities. The primary planning module 226 may select a branch of behavior for the AV to execute based on the collision-free trajectories.

As explained above, the primary control system 220 can experience failures or faulty events during which the fallback control system 230 may provide fallback controls to allow the AV to recover from the failures or faulty conditions. To that end, the fallback control system 230 may include a fallback perception module 232, a fallback prediction module 234, and a fallback planning module 236, each of which may be implemented using any suitable combination of hardware and/or software component(s). For example, the fallback perception module 232, the fallback prediction module 234, and the fallback planning module 236 may coordinate with each other to determine an alternative action for the AV. As explained above, the alternative action may not be activated under a normal condition and may be activated when a failure or a faulty condition occur at the primary control system 220.

The fallback perception module 232, the fallback prediction module 234, and the fallback planning module 236 may provide substantially the same functions as the primary perception module 222, the primary prediction module 224, and the primary planning module 226, respectively, but may utilize algorithms that are different from (or orthogonal to) algorithms utilized by the primary perception module 222, the primary prediction module 224, and the primary planning module 226. Using orthogonal algorithms between the primary control system 220 and the fallback control system 230 can advantageously avoid having both the primary control system 220 and the fallback control system 230 make the same faulty decision or fail at the same time.

In some aspects, the fallback perception module 232 may utilize heuristic algorithms and/or rules to determine a perception of an environment surrounding the AV instead of machine learning. For instance, the fallback perception module 232 may operate on LIDAR-only sensor data. The fallback perception module 232 may determine the presence of an object, a distance relative to the AV and/or a velocity of an object based on measurements determined from LIDAR point cloud data (e.g., the second sensor data 214). The fallback prediction module 234 may utilize heuristic algorithms and/or rules to predict trajectories of the AV and/or other traffic participants in the AV's vicinity. For instance, the fallback prediction module 234 may use linear extrapolation techniques and/or any other numerical analysis techniques that are not based on machine learning. As will be discussed more fully below, the fallback perception module 232 can generate occupancy grid maps based on the LIDAR point clouds to identify free space(s), occupied space(s), and/or unknown space(s) in a geographical area surrounding the AV.

In some aspects, the fallback perception module 232 may generate the occupancy grid maps repeatedly at a substantially fast rate (e.g., according to a scan frequency of the LIDAR sensors in use) to track objects that are in motion and provide motion information about the tracked objects. Accordingly, the fallback prediction module 234 can predict trajectories of other traffic participants near the AV using the 3D motion grid information.

In some aspects, the fallback planning module 236 may utilize heuristic algorithms and/or rules to plan an alternative path for the AV, for example, to bring the AV to a complete stop at a comfortable deceleration speed and without causing a collision. Additionally or alternatively, the fallback planning module 236 may guide the AV away from a high-risk area (e.g., an intersection, an oncoming traffic lane, an emergency driveway, etc.). For instance, the fallback planning module 236 may perform a search in a search space (e.g., representing an area around the AV and may be a continuous search space or a discretized search space) to determine candidate paths for the AV based on the perception and/or the predictions, determine a heuristic cost for each candidate path, and select a target path with a minimal heuristic cost from the candidate paths. In an example, a heuristic cost may be assigned to each segment of a path, and the cost may vary depending on whether the path segment causes the AV to go straight, turn left, turn right, or reverse, etc. Additionally or alternatively, the fallback planning module 236 may utilize polynomial fitting techniques to determine a path for the AV. In general, the fallback planning module 236 may utilize non-machine learning based techniques.

Further, the fallback planning module 236 may compute a path for the AV using less restrictive planning constraints than the primary planning module 226. As will discussed more fully below, in some instances, the fallback planning module 236 may use free space planning (e.g., without any lane limitation or generally less structural constraints) as opposed to the NCS used by the primary planning module 226. Additionally or alternatively, the fallback planning module 236 may utilize a reduce set of motions for the AV compared to the primary planning module 226. For instance, the fallback planning module 236 may plan a motion including braking, steering the AV within a certain angle less than the full angle range available to the vehicle, decelerating with a certain speed limit less that the full speed range available to the vehicle, etc.

As further shown in FIG. 2, the common control system 240 may include a path multiplexer module 242, which may be implemented using any suitable combination of hardware and/or software component(s). The path multiplexer module 242 may receive a first action from the primary control system 220 and an alternative action from the fallback control system 230. The path multiplexer module 242 may switch between the primary control system 220 and fallback control system 230 based on whether the AV is operating under a normal condition or a faulty condition. For instance, the path multiplexer module 242 may send appropriate commands to instruct the actuator system 250 (e.g., actuators, steering wheel, throttle, brakes, etc.) of the AV to maneuver according to a pathway (or the first action) determined by the primary planning module 226 under a normal condition. Upon a failure or faulty event at the primary control system 220, the path multiplexer module 242 may send appropriate commands to instruct the actuator system 250 to maneuver according to a pathway (or the alternative action) determined by the fallback planning module 236. In some examples, the faulty event may be triggered by a sensor failing to generate sensor data that is relied on by the primary control system 220, the primary perception module 222 failing to determine a perception, the primary prediction 224 failing to predict a trajectory for the vehicle and/or other traffic participants in the environment of the vehicle, and/or the primary planning module 226 failing to compute a path for the vehicle.

In some aspects, the common control system 240 may determine whether a failure has occurred at the primary control system 220 based on notifications provide by the primary control system 220 and/or other diagnostic or health information which may be collected by the AV control system 200. In some instances, the common control system 240 may further include a health monitoring or diagnostic module to monitor for errors, failures, and/or faulty conditions associated with the primary control system 220. In other instances, the health monitoring and/or diagnostic can be implemented as part of the path multiplexer module 242.

While FIG. 2 illustrates the primary control system 220 and the fallback control system 230 communicating with the same common control system 240, aspects are not limited thereto. For example, the primary control system 220 and the fallback control system 230 can each communicate with a different control system (e.g., different processing components) to generate control commands for controlling the AV according to respective actions, and the respective control systems can coordinate with each other to control the AV. Further, while FIG. 2 illustrates the modules 222, 224, and 226 as separate modules in the primary control system 220, these modules can be combined in any suitable manner. Similarly, the modules 232, 234, and 236 at the fallback control system 230 may be combined in any suitable manner.

Example Scenarios for AV Fallback Controls

FIGS. 3A-3B, 4, and 5A-5D illustrate various scenarios when fallback controls are used at an AV 302 (e.g., AV 10). For instance, the AV 302 may include an AV control system similar to the AV control system 200 of FIG. 2. The AV control system of the AV 302 may include a primary control system similar to the primary control system 220 and a fallback control system similar to the fallback control system 230.

Figure 3A:
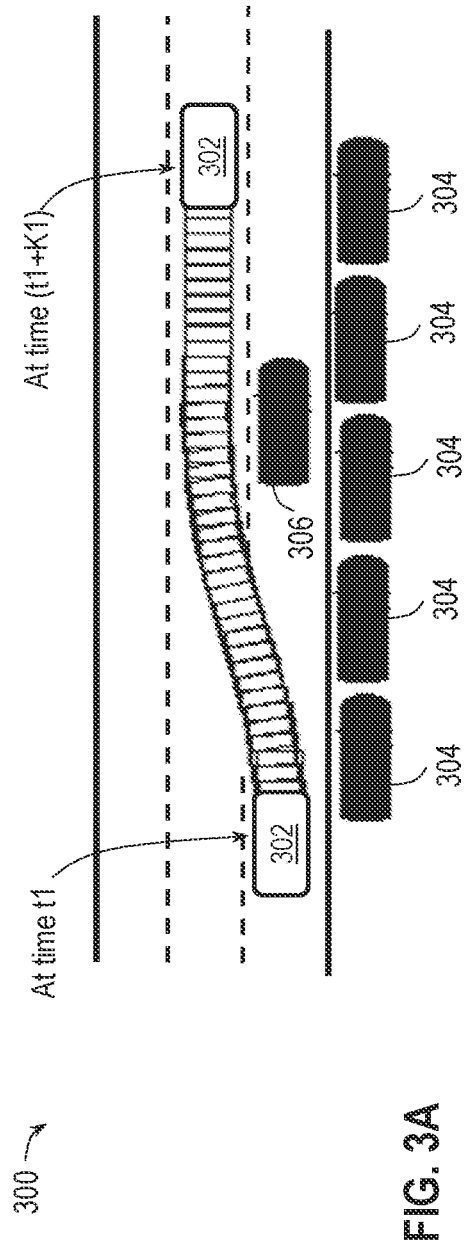
FIG. 3A illustrates an exemplary scenario in which a fallback control system of an AV takes control of the AV, according to some embodiments of the present disclosure.

FIG. 3A illustrates an exemplary scenario 300 in which the fallback control system of the AV 302 takes control of the AV 302, according to some embodiments of the present disclosure. In the scenario 300, the AV 302 may be traveling along a roadway with parked vehicles 304 and 306. The fallback control system of the AV 302 may be triggered to direct the AV 302 to change lane so that the AV 302 may avoid colliding with the double-parked vehicle 306 as shown by the series of boxes representing a progression of the AV 302 from time t1 to time (t1+K1).

Figure 3B:
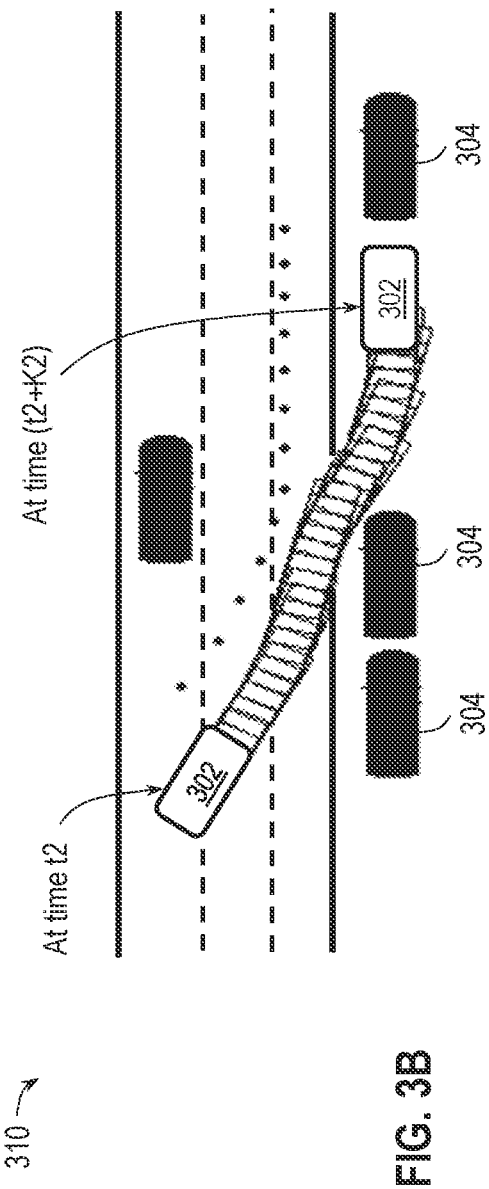
FIG. 3B illustrates an exemplary scenario in which a fallback control system of an AV takes control of the AV, according to some embodiments of the present disclosure.

FIG. 3B illustrates an exemplary scenario 310 in which the fallback control system of the AV 302 takes control of the AV 302, according to some embodiments of the present disclosure. In the scenario 310, the fallback control system of the AV 302 may be triggered to avoid cones (shown by the dots in FIG. 3B) and parked vehicles 304, and reaching a pullover location as shown by the series of boxes representing a progression of the AV 302 from time t2 to time (t2+K2).

Figure 4:
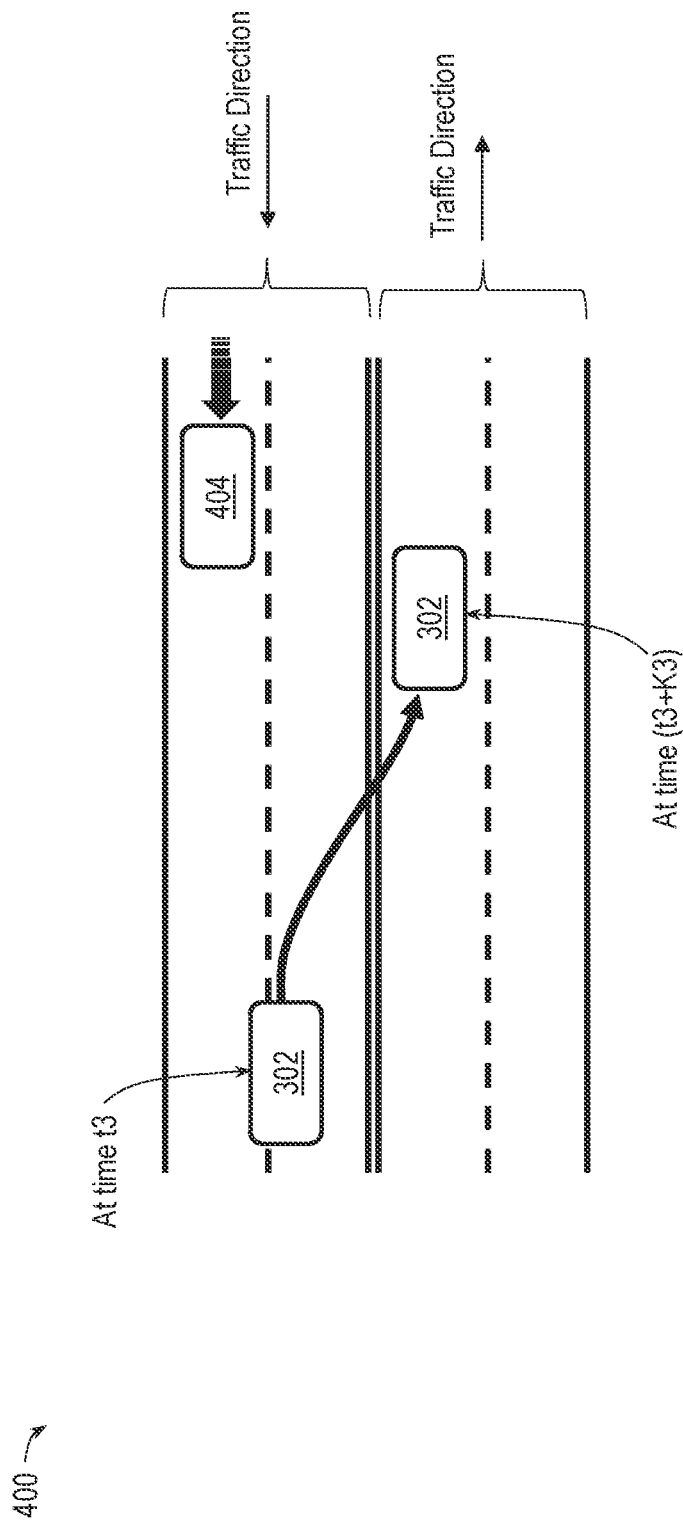
FIG. 4 illustrates an exemplary scenario in which a fallback control system of an AV performs autonomous creeping, according to some embodiments of the present disclosure.

FIG. 4 illustrates an exemplary scenario 400 in which a fallback control system of an AV performs autonomous creeping after taking control of the AV, according to some embodiments of the present disclosure. In the scenario 400, the AV 302 is in a lane for oncoming traffic at time t3. As shown, a vehicle 404 is traveling in an opposite direction than the AV 302. For instance, the fallback control system of the AV 302 may have brought the AV 302 to a stop after taking control of the AV 302, but the stopped area is in an oncoming lane. Under such a condition, the fallback control system of the AV 302 may perform autonomous creeping to move the AV 302 back to a nearest with the same traffic direction that the AV 302 is heading as shown by the arrow from time t3 to time (t3+K3).

5A-5D illustrate various scenarios in which the fallback control system of the AV 302 performs autonomous creeping upon the AV 302 stopping or entering an intersection area (e.g., a high-risk area) after the fallback control system of the AV 302 brings the AV 302 to a stop. The fallback control system of the AV 302 may find the least risky lane to guide the AV 302 to creep out of the intersection area.

FIG. 5A illustrates an exemplary scenario 500 in which a fallback control system of an AV performs autonomous creeping after taking control of the AV, according to some embodiments of the present disclosure. In the scenario 500, the AV 302 stops at a right turn lane. In general, the fallback control system of the AV 302 may direct the AV 302 to make a right turn as the highest priority when the AV 302 stops at a right turn lane. For instance, the fallback control system of the AV 302 may direct the AV 302 to make a right turn maneuver as long as the AV 302 is allowed to turn right, is on the rightmost lane, and/or kinematically feasible to turn right without driving into oncoming traffic lanes. As shown in FIG. 5A, the fallback control system of the AV 302 directs the AV 302 to make a right turn (shown by the arrow 502) even when the traffic light 504 is showing a red light (shown by the circle with the letter "R"), provided no collision may occur. If the traffic light 504 is showing a green light, the fallback control system of the AV 302 may also direct the AV 302 to make a right turn.

FIG. 5B illustrates an exemplary scenario 510 in which a fallback control system of an AV performs autonomous creeping after taking control of the AV, according to some embodiments of the present disclosure. In the scenario 510, the AV 302 stops at a location that passes the right turn lane. Under such a condition, the fallback control system of the AV 302 may still direct the AV 302 to make a right turn (shown by the arrow 512) irrespective of whether the traffic light 504 shows a green light or a red light, provided no collision may occur.

FIG. 5C illustrates an exemplary scenario 520 in which a fallback control system of an AV performs autonomous creeping after taking control of the AV, according to some embodiments of the present disclosure. In the scenario 520, the AV 302 stops at a location that blocks a right crossing lane (shown by the symbol "X") but has not passed a center boundary 524 or median of the road for crossing traffic. Under such a condition, the fallback control system of the AV 302 may direct the AV 302 to make a right turn (shown by the arrow 522) when the traffic light 504 is showing a red light, provided no collision may occur. If, however, the traffic light 504 is showing a green light, the fallback control system of the AV 302 may direct the AV 302 to continue to go straight, exiting the intersection area.

FIG. 5D illustrates an exemplary scenario 530 in which a fallback control system of an AV performs autonomous creeping after taking control of the AV, according to some embodiments of the present disclosure. In the scenario 530, the AV 302 stops at a location that passes a center boundary or median of the road for crossing traffic and not possible to turn right. Under such a condition, the fallback control system of the AV 302 may direct the AV 302 to continue to go straight (shown by the arrow 532), exiting the intersection area irrespective of whether the traffic light 504 shows a green light or a red light, provided no collision may occur.

In general, the fallback control system of the AV 302 may use various heuristic-based rules (e.g., including traffic rules) to direct the AV 302 to exit a high-risk area (e.g., an intersection). More specifically, a fallback planner (e.g., the fallback planning module 236) of the AV 302 may compute a collision-free path or the AV 302 to exit a high-risk area. As another example, the AV 302 may be assumed to be on a straight lane as long as there are straight lane options nearby the AV 302 and the AV 302 is not blocking any oncoming traffic lane. Accordingly, in cases where the AV 302 is partially on a left turn lane, the fallback control system of the AV 302 may perform a straight lane creeping logic as long as the AV is not blocking the oncoming lanes, and there is a straight lane close to the AV. As yet another example, when the AV 302 stops at an unprotected left turn only lane, the fallback control system of the AV 302 may direct the AV 302 to make a left if there is no straight lane nearby or the straight lanes are blocked, and the AV 302 is blocking the oncoming traffic lane.

Example AV Fallback Control System

Figure 6:
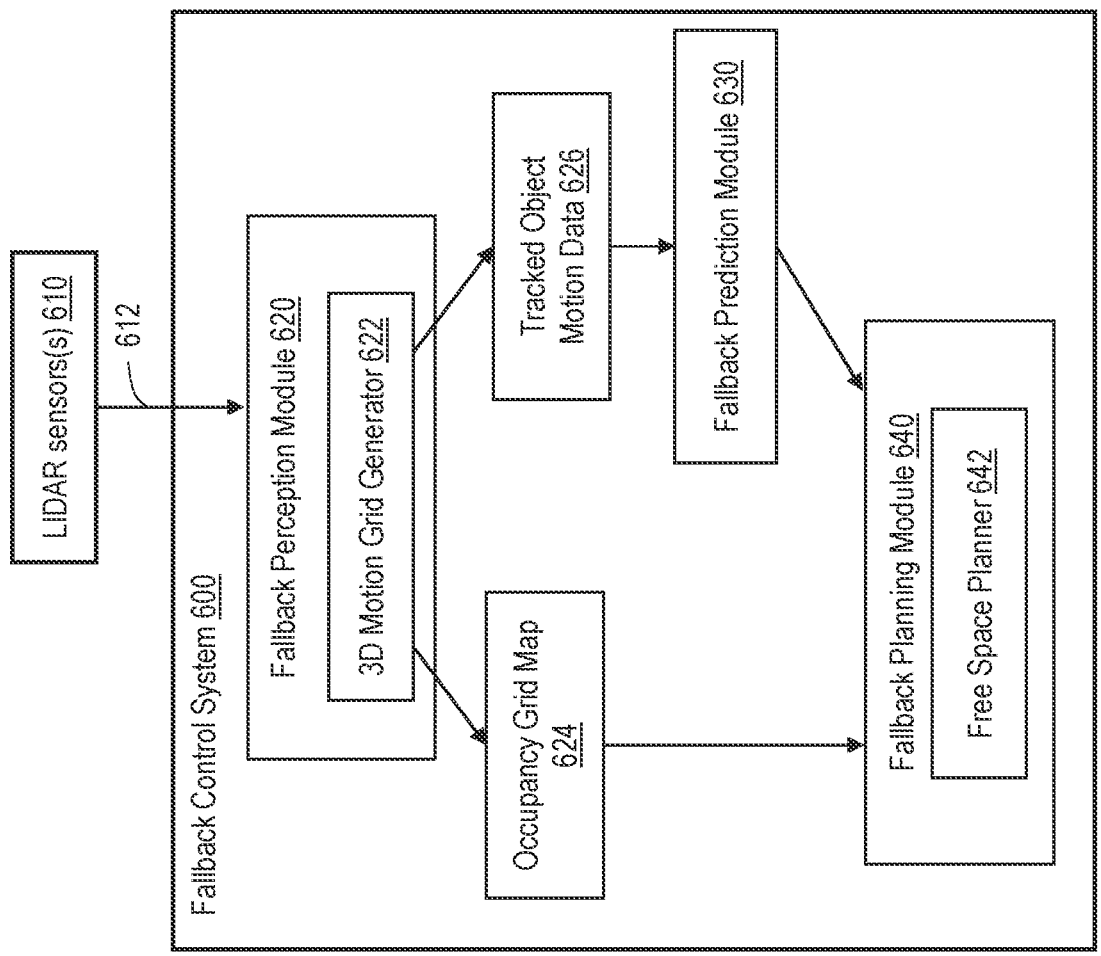
FIG. 6 is a block diagram illustrating an exemplary fallback control system of an AV that implements three-dimensional (3D) motion grid information generation and free space planning, according to some embodiments of the present disclosure.

FIG. 6 is a block diagram illustrating an exemplary fallback control system 600 that implements 3D motion grid information generation and free space planning, according to some embodiments of the present disclosure. The fallback control system 600 may be included by an AV such as the AV 10 of FIG. 1 or the AV 302 of FIGS. 3A-3B, 4, and 5A-5D for fallback controls. In some aspects, the AV control system 200 of FIG. 2 may include the fallback control system 600 in place of the fallback control system 230.

As shown, the fallback control system 600 may include a fallback perception module 620, a fallback prediction module 630, and a fallback planning module 640. The fallback perception module 620 may be similar to the fallback perception module 232 in many respects. For instance, the fallback perception module 620 may determine a perception of a surrounding environment of the AV, for example, based on LIDAR data 612 collected from LIDAR sensor(s) 610 (e.g., the LIDAR sensors 212b) of the AV. In some instances, the LIDAR sensor(s) 610 may be installed at a roof top of the AV. Additionally, the fallback perception module 620 may perform 3D motion grid generation to provide real-time motion information so that the fallback control system 600 can determine a response or action for the AV quickly.

In some aspects, the fallback perception module 620 may include a 3D motion grid generator 622. The 3D motion grid generator 622 may partition a 3D space (outside of the AV) captured by the LIDAR data 612 (e.g., 3D point clouds) into grids or cells. The LIDAR sensor(s) 610 may perform captures repeatedly, for example, according to a scan frequency configured at the LIDAR sensor(s) 610, and thus may feed LIDAR data 612 to the 3D motion grid generator 622 repeatedly. The 3D motion grid generator 622 may analyze measurements provided by the LIDAR data 612 from one time instant to another time instant and over a duration of time to determine whether each grid in the 3D space is occupied, free, or unknown. An occupied space may refer to an area or space that are occupied by object(s) (e.g., vehicles, people, buildings, trees, etc.). A free space may refer to an area or space in which no object is present. An unknown space may refer to an area or space in which the 3D motion grid generator 622 may fail to conclude whether it is free or occupied. The 3D motion grid generator 622 may generate a occupancy grid map 624 including a plurality of grids corresponding to spaces, areas, and/or cells the 3D space. The occupancy grid map 624 may include an indication for each grid of the plurality of grids indicating whether the respective grid is an occupied space, a free space, or an unknown space (e.g., as shown in the occupancy grid maps 700 and 710 of FIG. 7).

Further, the 3D motion grid generator 622 may identify objects in the 3D space that are moving based on the LIDAR data 612 captured at different time instants over a duration (e.g., a temporal window). Accordingly, the 3D motion grid generator 622 may track the moving objects and determine motion information associated with the tracked objects. The motion information can include estimates of the position, velocity, acceleration, and/or size (e.g., length/width) associated with the tracked object(s). The 3D motion grid generator 622 may generate tracked object motion data 626 including indications of the tracked objects and associated motion information. The tracked object motion data 626 can be provided to the fallback prediction module 630, which may then predict trajectories of objects in the AV's vicinity using the tracked object motion data 626.

The fallback planning module 640 may plan a path for the AV using the occupancy grid map 624 output by the 3D motion grid generator 622 and/or the predictions (e.g., predicted trajectories of the tracked objects) output by the fallback prediction module 630. In some aspects, the fallback planning module 640 may include a free space planner 642. The free space planner 642 may compute a collision-free path for the AV to maneuver based on free space(s) indicated by the occupancy grid map 624. As an example, the free space planner 642 may compute a path that traverses through free space(s) avoiding any occupied area, unknown area, and/or obstacles on the roads. The free space planner 642 may compute the path without considering any lane limitation (e.g., without avoiding driving in a bike lane or travel within a traffic lane, etc.).

Figure 7:
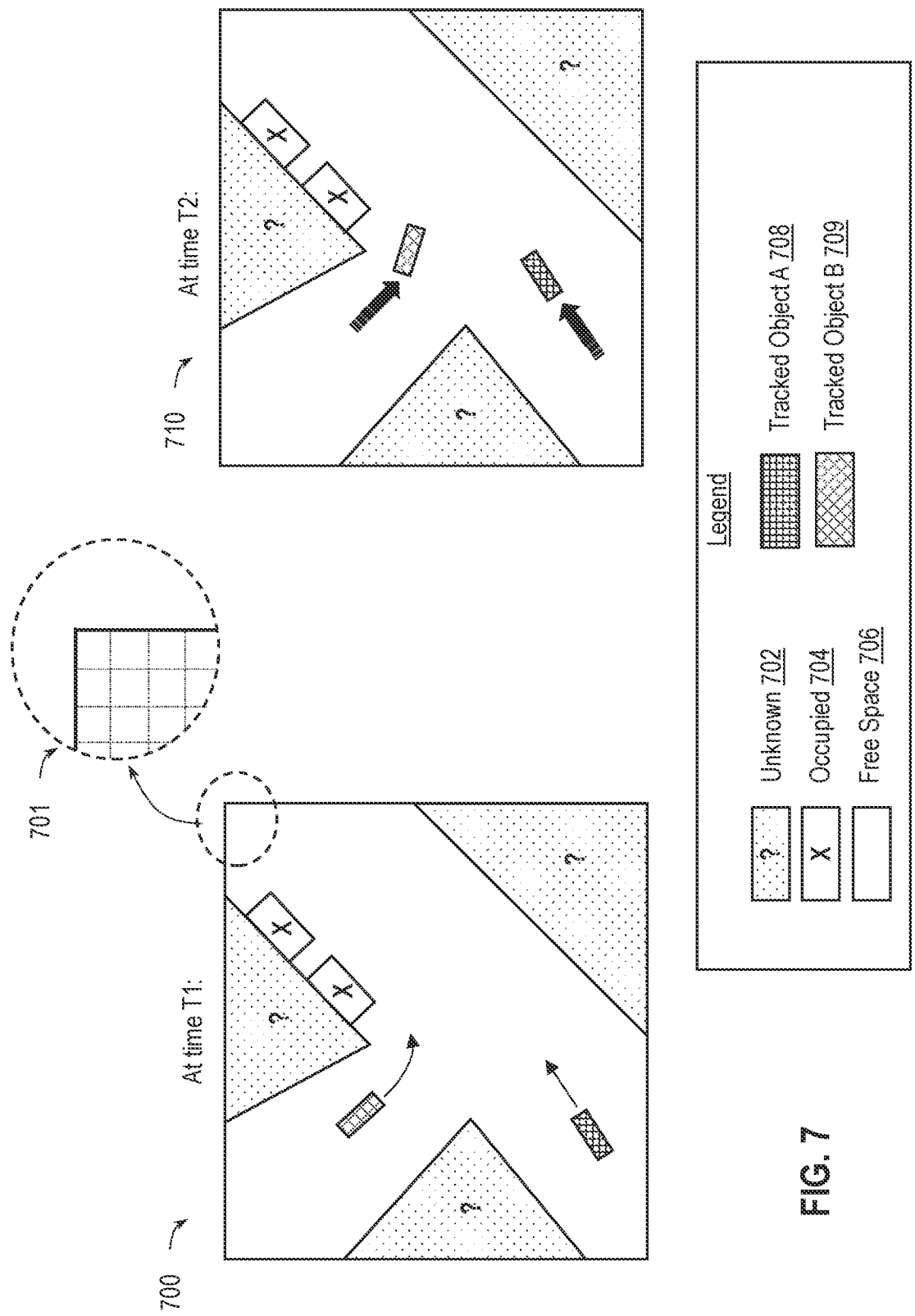
FIG. 7 illustrates exemplary occupancy grid maps, according to some embodiments of the present disclosure.

FIG. 7 illustrates exemplary occupancy grid maps 700 and 710, according to some embodiments of the present disclosure. For instance, the occupancy grid maps 700 and 710 may be generated by the 3D motion grid generator 622 of FIG. 6. The occupancy grid maps 700 and 710 may represent about the same geographical area around the AV. The occupancy grid map 700 may be generated based on LIDAR data 612 captured at time T1, and the occupancy grid map 700 may be generated based on new LIDAR data 612 captured at time T2. In general, the 3D motion grid generator 622 can generate occupancy grid maps at any suitable rate (e.g., according to the scan frequency of the LIDAR sensor(s) 610) or at a slower rate). For simplicity of illustration, the grid lines for the occupancy grid maps 700 and 710 are not shown.

For simplicity of illustration, grid lines are only shown for an expanded view 701 of a portion of the occupancy grid map 710. However, in general, the occupancy grid maps 700 and/or 710 may be partitioned into grids of any suitable granularity (e.g., with uniform grid size or nonuniform grid size) and may include an indication for each grid indicating whether the respective grid is an occupied space, a free space, or an unknown space. As shown, the occupancy grid map 700 (for time T1) include indications of free spaces 706 (shown by empty filled shapes), occupied spaces 704 (shown by the symbols "X"), and unknown spaces 702 (shown by the symbols "?"). Further, the occupancy grid map 710 may include indications of tracked objects (moving objects), for example, a tracked object A 708 and a tracked object B 709 with respective arrows. The occupancy grid map 710 (for time T2) may be substantially similar to the occupancy grid map 700. As shown, the occupancy grid map 700 may include indications of free spaces 706, occupied spaces 704, and unknown spaces 702. Additionally, the occupancy grid map 710 may also include indications of the tracked object A 708 and the tracked object B 709 moved to new locations compared to the occupancy grid map 700 as shown by the arrows. For instance, the 3D motion grid generator 622 may determine motion information (e.g., including position, velocity, acceleration, and/or size) for the tracked object A 708 and B 709 based on the LIDAR data received at time T1 and at time T2 and output the motion information as part of the tracked object motion data 626.

In some aspects, the AV 302 in the scenarios 300, 310, 400, 500, 510, 520, and 530 discussed above with reference to FIGS. 3A, 3B, 4, 5A, 5B, 5C, and 5D, respectively, may include the fallback control system 600 of FIG. 6, and may compute paths to bring the AV 302 to a complete stop and/or autonomous creeping using the occupancy grid map 624, tracked object motion data 626, and free space planning implemented by the free space planner 642 as discussed above.

Example Processes for Operating an AV with Fallback Controls

Figure 8:
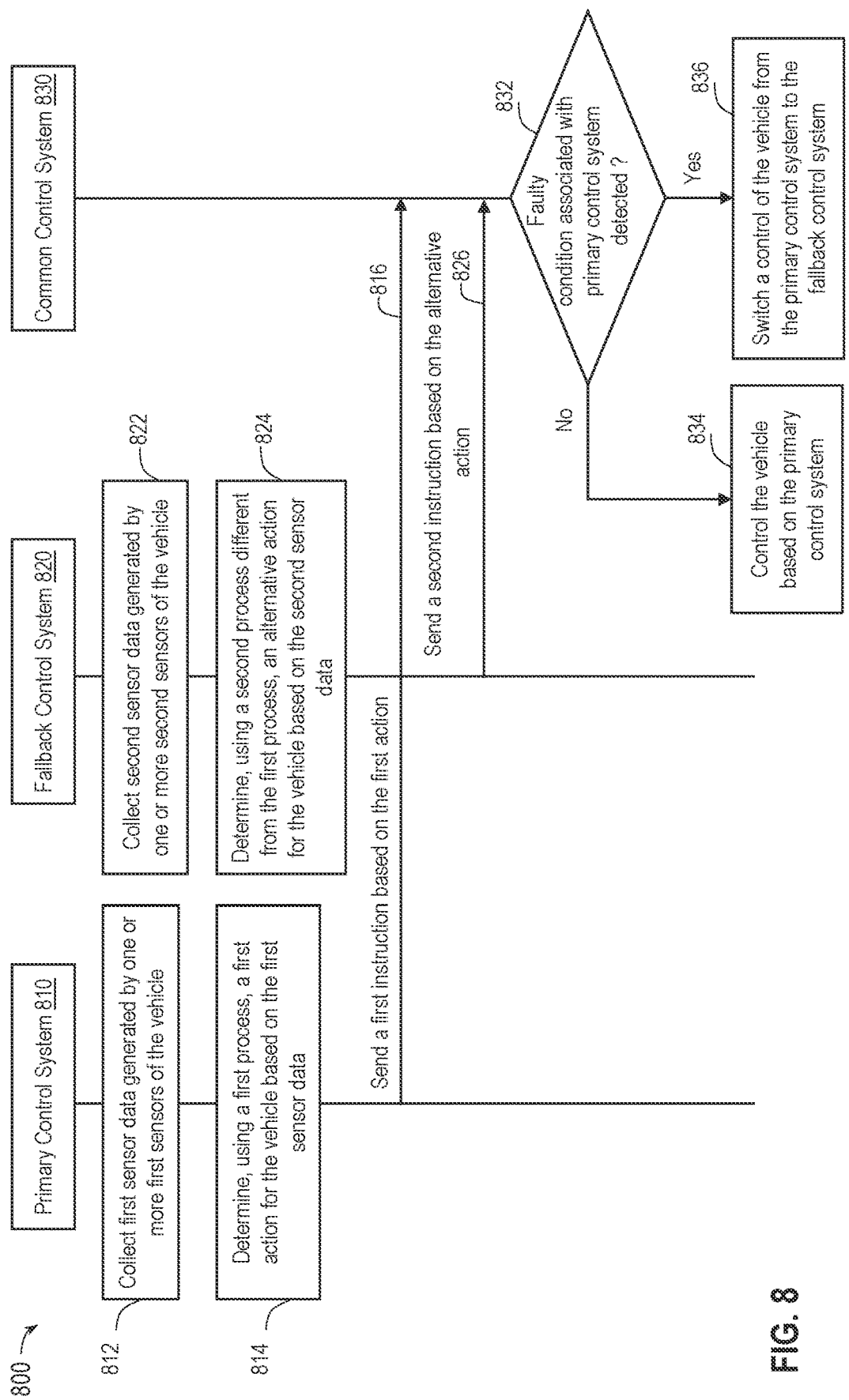
FIG. 8 is a sequence diagram illustrating a process for operating an AV with fallback controls, according to some embodiments of the present disclosure.

FIG. 8 is a sequence diagram illustrating a process 800 for operating an AV with fallback controls, according to some embodiments of the present disclosure. The process 800 may be implemented between a primary control system 810, a fallback control system 820, and a common control system 830. The primary control system 810, the fallback control system 820, and the common control system 830 may be included at a vehicle (e.g., the AV 10 of FIG. 1 and/or the AV 302 of FIGS. 3A-3B, 4, and 5A-5D) for controlling the vehicle. In some aspects, the primary control system 810, the fallback control system 820, and the common control system 830 may correspond to the primary control system 220, the fallback control system 230, and the common control system 240 of FIG. 2, respectively. In some aspects, the fallback control system 820 may correspond to the fallback control system 600 of FIG. 6. The process 800 may utilize similar mechanisms discussed above with reference to FIGS. 1-2, 3A-3B, 4, 5A-5D, and 6-7. Operations are illustrated once each and in a particular order in FIG. 8, but the operations may be performed in parallel, reordered, and/or repeated as desired. For instance, the primary control system 810 may perform the operations at 812, 814, and 816 in parallel with the fallback control system 820 performing the operations at 822, 824, and 826.

At 812, the primary control system 810 may collect first sensor data (e.g., the first sensor data 212) generated by one or more first sensors of the vehicle. The one or more first sensors may be similar to the sensors in the sensor system 28 of FIG. 1 or in the sensor suite 210 of FIG. 2.

At 814, the primary control system 810 may determine, using a first process (or algorithm(s)), a first action for the vehicle based on the first sensor data. The first process can include determining a perception of an environment surrounding the vehicle based on the first sensor data, predicting trajectories of the vehicle and/or other traffic participants in the environment based on the perception, and planning a path for the vehicle based on the prediction(s), for example, as discussed above with reference to FIGS. 1-2.

At 822, the fallback control system 820 may collect second sensor data (e.g., the second sensor data 214) generated by one or more second sensors of the vehicle. The one or more second sensors may be similar to the sensors in the sensor system 28 of FIG. 1 or in the sensor suite 210 of FIG. 2. In some aspects, the second sensor data may be a subset of the first sensor data collected by the primary control system 810 at 812 and the subset is less than all of the first sensor data. That is, the one or more second sensors may be a subset of the one or more first sensors. For instance, the one or more first sensors may include cameras and LIDAR sensors on the vehicle, and the one or more second sensors may correspond to the LIDAR sensors. As such, the first sensor data may include image data from the cameras and point clouds from the LIDAR sensors, whereas the second sensor data may include the point clouds (LIDAR data) but not the image data. In other aspects, the one or more second sensors may be separate from the one or more first sensors (e.g., for example, to provide sensor hardware redundancy). For instance, the one or more first sensors may include cameras and LIDAR sensors on the vehicle, and the one or more second sensors may include other LIDAR sensors on the vehicle. Thus, the second sensor data may be separate from the first sensor data. In some examples, all of the one or more second sensors are LIDAR sensors.

At 824, the fallback control system 820 may determine, using a second process (or algorithm(s)) different from the first process, an alternative action for the vehicle based on the second sensor data. The second process can include determining a perception of an environment surrounding the vehicle based on the second sensor data, predicting trajectories of the vehicle and/or other traffic participants in the environment based on the perception, and computing a path for the vehicle based on the predictions, for example, as discussed above with reference to FIGS. 1-2, 3A-3B, 4, 5A-5D, and 6-7. In some aspects, the goal of the fallback control system 820 is to bring the vehicle to a complete stop at a comfortable speed (e.g., no hard brake if unnecessary) and without causing any collision (e.g., avoid rear end collision, etc.) if the primary control system 810 fails to operate the vehicle. Thus, the alternative action may include at least stopping the vehicle. In some aspects, as part of determining the alternative action, the fallback control system 820 may determine a motion plan for the vehicle based on a parameter associated with at least one of a deceleration, a traffic rule, or a passenger comfort level.

In some aspects, the first process used by the primary control system 810 to determine the first action at 814 may use machine learning algorithms while the second process used by the fallback control system 820 to determine alternative action may use heuristic algorithms (e.g., rules are interpretable and/or analysis that are expressible by mathematical equations).

In some aspects, the primary control system 810 may determine the first action at 814 by computing a path for the vehicle based on a first set of constraints (e.g., planning constraints) while the fallback control system 820 may determine the alternative action by computing an alternative path for the vehicle using a second set of constraints (e.g., planning constraints) different from the first set of constraints. For instance, the second set of constraints may be less stringent and/or include a fewer number of constraints than the first set of constraints. Further, in some aspects, the fallback control system 820 may compute the alternative path based on occupancy grid maps (e.g., the occupancy grid maps 624, 700, and/or 710), motion information of traffic participants in the environment (e.g., the tracked object motion data 626), and free space planning (e.g., independent of any lane limitation) as discussed above with reference to FIGS. 6 and 7.

In some aspects, the primary control system 810 may determine the first action at 814 by selecting the first action from a full set of candidate actions while the fallback control system 820 may determine the alternative action by selecting the alternative action from a reduced set of candidate actions. For instance, the reduce set of candidate actions may include braking, steering the AV within a certain angle range less than the full angle range available to the vehicle, decelerating with a certain speed range less that the full speed range available to the vehicle, etc.

At 816, the primary control system 810 may send, and the common control system 830 may receive, a first instruction including an indication of the first action. In some examples, the first action may include a sequence of planned maneuvers for the vehicle, such as going straight, followed by making a turn, etc.

At 826, the fallback control system 820 may send, and the common control system 830 may receive, a second instruction including an indication of the alternative action. The second instruction be used for modifying (or interrupting, overriding) the first action determined by the primary control system 810 if a faulty condition associated with the primary control system 810 does occur. In some examples, the alternative action may include a sequence of planned maneuvers for the vehicle, such as going straight, decelerating at a certain speed, followed by braking, etc. In general, the fallback control system 820 may send or provide an indication of the alternative action and other modules (e.g., in the primary control system 810 and/or common control system 830) may utilize information associated with the alternative action for vehicle planning.

At 832, the common control system 830 may determine whether a faulty condition associated with the primary control system 810 is detected. In some examples, the faulty condition may be triggered by a sensor failing to generate sensor data that is relied on by the primary control system 810. Additionally or alternatively, the faulty condition may be triggered by the primary control system 810 failing to determine a perception, failing to predict a trajectory for the vehicle and/or other traffic participants in the environment of the vehicle. Additionally or alternatively, the faulty condition may be triggered by the primary control system 810 failing to compute a path for the vehicle. In general, the faulty condition may be triggered by a failure or a fault at any one or more components of the primary control system 810.

If there is no faulty condition associated with the primary control system 810 detected, the common control system 830 may proceed to 834. At 834, the common control system 830 may control the vehicle based on the primary control system 810. For instance, the common control system 830 may generate, based on the first action determined by the primary control system 810, control commands and/or parameters for controlling an actuator system (e.g., the actuator system 30 and/or 250) of the vehicle, and send the control commands and/or parameters to the actuator system.

If, however, the common control system 830 detected a faulty condition associated with the primary control system 810, the common control system 830 may proceed to 836. At 836, the common control system 830 may switch a control of the vehicle from the primary control system 810 to the fallback control system 820. For instance, the common control system 830 may generate, based on the alternative action determined by the fallback control system 820, control commands or parameters for controlling the actuator system of the vehicle, and send the control commands and/or parameters to the actuator system. As an example, the vehicle may correspond to the AV 302 shown in FIG. 3A, and the alternative action determined by the fallback control system 820 may include directing the AV 302 to change lane so that the vehicle may avoid colliding with the double-parked vehicle 306. As another example, the vehicle may correspond to the AV 302 shown in FIG. 3B, and the alternative action determined by the fallback control system 820 may include directing the AV 302 to avoid cones and parked vehicles 304, and reaching a pullover location.

In some aspects, after the fallback control system 820 brings the vehicle to a stop, the fallback control system 820 may determine whether the vehicle is stopped at a high-risk area (e.g., in an oncoming traffic lane as shown in the scenario 400 of FIG. 4 or in an intersection as shown in the scenarios 500-530 of FIGS. 5A-5D). If the vehicle is stopped at a high-risk area, the fallback control system 820 may perform autonomous creeping as discussed above and/or using the process 900 of FIG. 9 discussed below to bring the vehicle out of the high-risk area.

Figure 9:
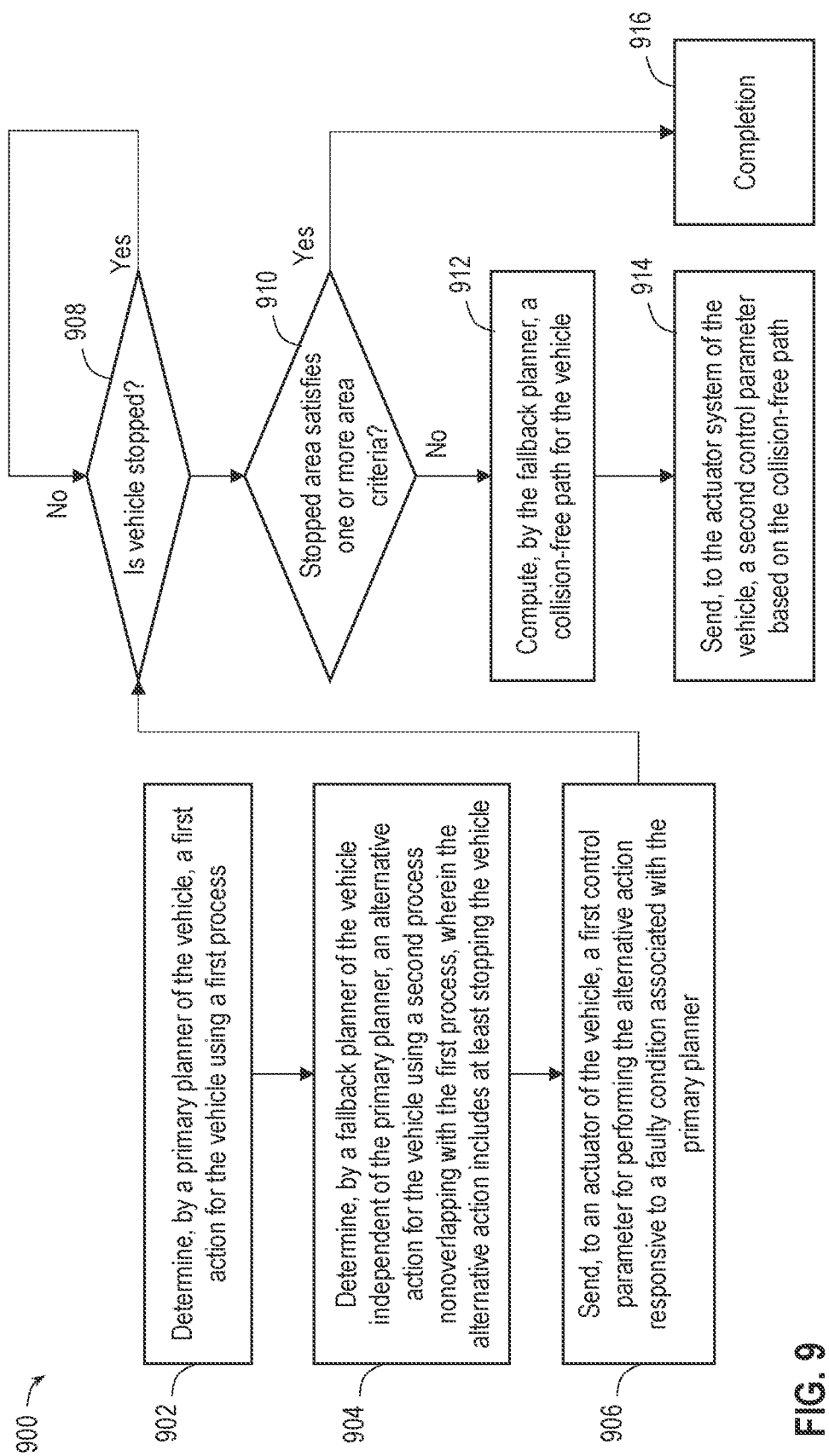
FIG. 9 is a flow diagram illustrating a process for operating an AV with fallback controls, according to some embodiments of the present disclosure.

FIG. 9 is a flow diagram illustrating a process 900 for operating an AV with fallback controls, according to some embodiments of the present disclosure. The process 800 can be implemented by a vehicle such as the AV 10 of FIG. 1, the AV control system 200 of FIG. 2, the AV 302 of FIGS. 3A-3B, 4, and 5A-5D, and/or the computer system 1000 of FIG. 10. Although the operations of the process 900 may be illustrated with reference to particular embodiments disclosed herein, the process 900 may be performed using any suitable hardware components and/or software components. The process 900 may utilize similar mechanisms discussed above with reference to FIGS. 1-2, 3A-3B, 4, and 5A-5D, and 6-8. Operations are illustrated once each and in a particular order in FIG. 9, but the operations may be performed in parallel, reordered, and/or repeated as desired.

At 902, a first action for the vehicle may be determined by a primary planner of the vehicle using a first process. The primary planner may correspond to the primary planning module 226 of FIG. 2, the primary control system 810 of FIG. 8, or the primary controller 1014 of FIG. 10.

At 904, an alternative action for the vehicle may be determined by a fallback primary planner of the vehicle independent of the primary planner and using a second process different from (or orthogonal to) the first process. The alternative action may include at least stopping the vehicle. In some instances, the first process may be based on machine learning algorithms while the second process may be based on heuristic algorithms, traffic rules, traffic participant behavioral rules, etc. The fallback planner may correspond to the fallback planning module 236 of FIG. 2, the fallback planning module 640 of FIG. 6, the fallback control system 820 of FIG. 8, or the fallback controller 1016 of FIG. 10.

At 906, a first control parameter (or a sequence of parameters) for performing the alternative action (e.g., to stop the vehicle) may be sent to an actuator system of the vehicle responsive to a faulty condition associated with the primary planner. For instance, the fallback planner may send information associated with the alternative action to a controller or path multiplexer (e.g., the path multiplexer module 242) of the vehicle, and the controller or path multiplexer may generate the control parameter and send the control parameter to the actuator system. The actuator system may operate according to the first control parameter, for example, to bring the vehicle to a stop.

At 908, a determination of whether the vehicle is stopped may be made. If the vehicle is not at a stop, the operation of 908 may be repeated (e.g., repeat monitoring for a stop at the vehicle). If, however, the vehicle is stopped, the process 900 may proceed to 910. At 910, a determination of whether the area at which the vehicle is stopped satisfies one or more area criteria may be made. The one or more criteria may be associated with an intersection, an oncoming traffic lane, an emergency driveway, etc., that may obstruct other traffic or prone to cause a collision. That is, if the vehicle is stopped at any one of those areas, the one or more area criteria are not satisfied. In some examples, the one or more criteria can include a threshold risk level, and as part to the determination at 910, the fallback planner can determine an area risk level for the stopped area and compare the are risk level to the threshold risk level.

If the stopped area fails to satisfy the one or more criteria, the process 900 may proceed to 912. At 912, a collision-free path may be computed for the vehicle by the fallback planner. In some aspects, as part of computing the collision-free path, the fallback planner may determine candidate exit roads, each including one or more exit lanes. The fallback planner may further filter the exit lanes of the candidate exit roads based on one or more exit criteria. Some examples of the one or more exit criteria may be associated with a distance to travel from a current location of the vehicle to a respective exit lane, the number of lanes that the vehicle may cross to get to the exit lane, whether the path goes to an undrivable area, etc. The fallback planner may further select a first exit lane from the filtered exit lanes based at least in part on a distance between a location of the vehicle. For instance, the fallback planner may select the first exit lane based on the first exit lane having the shortest travel distance from the vehicle's location among the filtered exit lanes. The fallback planner may further assign the path from the vehicle's location to the selected first exit lane as the collision-path. In some aspects, as part of computing the collision-free path, the fallback planner may determine whether a path from the location of the vehicle to the first exit lane is statically and dynamically collision-free, for example, by using occupancy grid maps (e.g., the occupancy grid maps 624, 700, and/or 710), motion information of traffic participants in the environment (e.g., the tracked object motion data 626), and free space planning (e.g., independent of any lane limitation) as discussed above with reference to FIGS. 6 and 7.

As an example, the vehicle may correspond to the AV 302 shown in FIG. 5A (stopped at a right turn lane of an intersection), and the collision-free path may correspond to the right turn path shown by the arrow 502 in FIG. 5A. As another example, the vehicle may correspond to the AV 302 shown in FIG. 5B (stopped at location that passes a right turn lane of an intersection but before the median of cross traffic), and the collision-free path may correspond to the right turn path shown by the arrow 512 in FIG. 5B. As yet another example, the vehicle may correspond to the AV 302 shown in FIG. 5C (stops at a location that blocks a right crossing lane but has not passed the median of cross traffic), and the collision-free path may correspond to the right turn path shown by the arrow 522 in FIG. 5C. As a further example, the vehicle may correspond to the AV 302 shown in FIG. 5D (stopped at a location that passes a center boundary or median of the road for crossing traffic and not possible to turn right), and the collision-free path may correspond to the straight path shown by the arrow 532 in FIG. 5D.

At 914, a second control parameter (or a set of parameters) based on the collision-path may be sent to the actuator system. Similar to 906, the fallback planner may send information associated with the collision-path to the controller or the path multiplexer (e.g., the path multiplexer module 242) of the vehicle, and the controller or path multiplexer may generate the second control parameter and send the send control parameter to the actuator system. The actuator system may maneuver the vehicle according to the second control parameter, for example, to travel along the collision-free path.

Returning to 910, if the stopped area satisfies the one or more area criteria, the fallback controls are completed as shown by 916, and the control of the vehicle may be switched back to the primary planner.

Example Computing System

Figure 10:
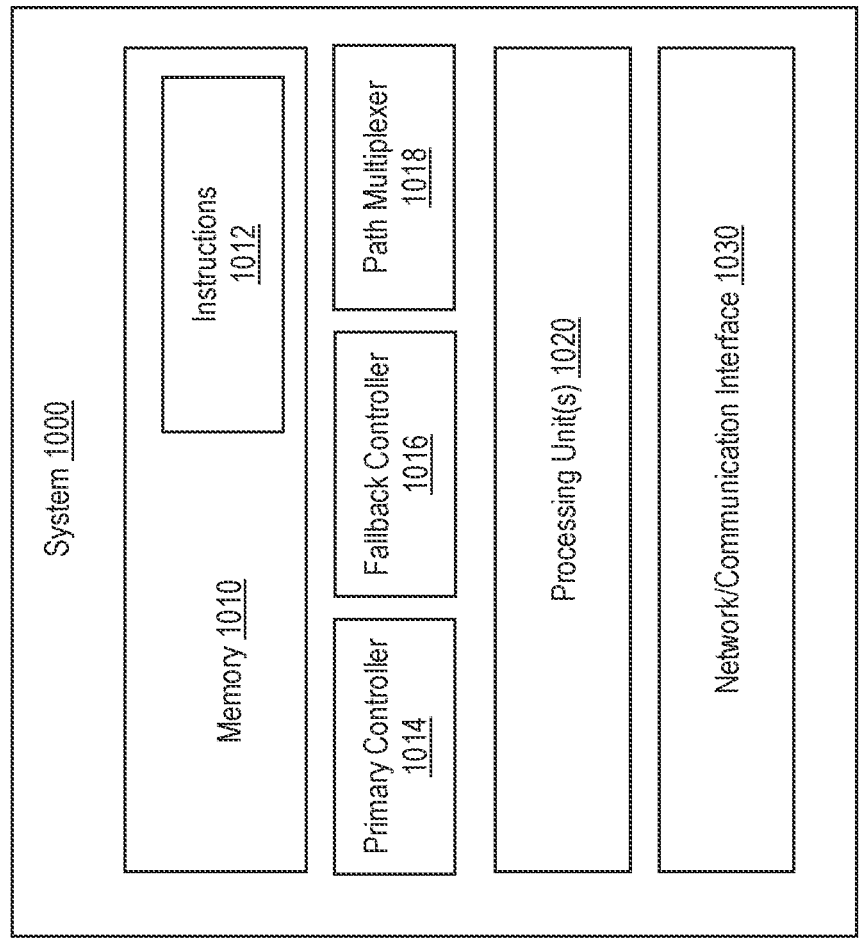
FIG. 10 illustrates an exemplary computing system used in various embodiments of the present disclosure.

FIG. 10 illustrates components of a computing system 1000 used in implementations described herein. In some embodiments, the components of FIG. 10 can be present in a vehicle or an AV (e.g., the AV 10 of FIG. 1, the AV 302 of FIG. 3). In other embodiments, the components of FIG. 10 can be present in an infrastructure system for AV.

Referring to FIG. 10, system 1000 can be implemented within one computing device or distributed across multiple computing devices or subsystems that cooperate in executing program instructions. In some implementations, the system 1000 can include one or more blade server devices, standalone server devices, personal computers, routers, hubs, switches, bridges, firewall devices, intrusion detection devices, mainframe computers, network-attached storage devices, smartphones and other mobile telephones, and other computing devices. The system hardware can be configured according to any suitable computer architectures such as a Symmetric Multi-Processing (SMP) architecture or a Non-Uniform Memory Access (NUMA) architecture.

The system 1000 can include one or more processing units 1020, which can include one or more hardware processors and/or other circuitry that retrieves and executes instructions 1012 (e.g., software or firmware codes) from memory 1010. The one or more processing units 1020 can be implemented within one processing device, chip, or package and can also be distributed across multiple processing devices, chips, packages, or subsystems that cooperate in executing program instructions. In one implementation, the one or more processing units 1020 may include a CPU and a GPU. The GPU can execute the visual/image processing in the computing system. The GPU, or any second-order processing element independent from CPU dedicated to processing imagery and other perception data in real or near real-time, can provide a significant benefit.

The memory 1010 can include any computer-readable storage media readable by one or more processing unit(s) 1020 and that stores instructions 1012. The memory 1010 can be implemented as one storage device and can also be implemented across multiple co-located or distributed storage devices or subsystems. The memory 1010 can include additional elements, such as a controller, that communicate with the one or more processing units 1020. The memory 1010 can also include storage devices and/or subsystems on which data and/or instructions may be stored. System 1000 can access one or more storage resources to access information to carry out any of the processes indicated by instructions 1012.

The instructions 1012, including routines for at least partially performing at least one of the processes illustrated in FIGS. 1-2, 3A-3B, 4, 5A-5D, 6-9, can be implemented in program instructions. Further, the instructions 1012, when executed by system 1000 in general or the one or more processing unit(s) 1020 in particular, can direct, among other functions, the system 1000 or the one or more processing units 1020 to operate as described herein.

In some embodiments, the system 1000 may further include a primary controller 1014, a fallback controller 1016, and a path multiplexer 1018, for example, when the system 1000 is part of an AV such as the AV 10 of FIG. 1 or the AV 302 of FIG. 3A-3B, 4, 5A-5D, 6-9. Each of the primary controller 1014, fallback controller 1016, and the path multiplexer 1018 can include hardware and/or software components. In some examples, the primary controller 1014, the fallback controller 1016, and/or the path multiplexer 1018 can be implemented as part of the one or more processing unit(s) 1020. The primary controller 1014 may implement operations of a primary control system (e.g., the primary control system 220 of FIG. 2, the primary control system 810 of FIG. 8), for example, to determine nominal actions for the AV, as discussed herein. The fallback controller 1016 may implement operations of a fallback control system (e.g., the fallback control system 230, the fallback control system 600, the fallback control system 820 of FIG. 8), for example, to determine alternative actions for the AV, as discussed herein. The path multiplexer 1018 (e.g., the path multiplex module 242 of FIG. 2, the common control system 830 of FIG. 8) may switch between using a path (or action) computed by the primary controller 1014 or using a path (or action) computed by the fallback controller 1016 (e.g., when there is a fault event at the primary controller 1014) to control the vehicle as discussed herein.

In implementations where the system 1000 may include multiple computing devices, the server can use one or more communications networks that facilitate communication among the computing devices. For example, the one or more communications networks can include or be a local or wide area network that facilitates communication among the computing devices. One or more direct communication links can be included between the computing devices. In addition, the computing devices can be installed at geographically distributed locations or at one geographic location, such as a server farm or an office.

System 1000 can include a communications interface 1030 that provides one or more communication connections and/or one or more devices that allow for communication between system 1000 and other computing systems (not shown) over a communication network or collection of networks (not shown) or the air.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Selected Examples

Example 1 includes a method including collecting, by a fallback control system of a vehicle, sensor data generated by one or more sensors of the vehicle; determining, by the fallback control system using a first process different from a second process of a primary control system of the vehicle, an alternative action for the vehicle based on the sensor data; and sending, by the fallback control system based on the alternative action, an instruction for modifying an action associated with the primary control system upon a faulty condition associated with the primary control system.

In Example 2, the method of Example 1 can optionally include where the sensor data for determining the alternative action includes light detection and ranging (LIDAR) data.

In Example 3, the method of any of Examples 1-2 can optionally include where the sensor data for determining the alternative action is generated by the one or more sensors including a light detection and ranging (LIDAR) data located at a roof of the vehicle.

In Example 4, the method of any of Examples 1-3 can optionally include where the alternative action determined by the fallback control system includes at least stopping the vehicle.

In Example 5, the method of any of Examples 1-4 can optionally include where the determining the alternative action includes determining a motion plan to stop the vehicle based on a parameter associated with at least one of a deceleration, a traffic rule, or a passenger comfort level.

In Example 6, the method of any of Examples 1-5 can optionally include where the determining the alternative action includes performing, by the fallback control system, at least one of a perception, a prediction, or a planning using the first process different from the second process of the primary control system.

In Example 7, the method of any of Examples 1-6 can optionally include where the first process used for determining the alternative action is based on rules; and the second process of the primary control system is based on machine learning.

In Example 8, the method of any of Examples 1-7 can optionally include where the determining the alternative action for the vehicle includes computing an alternative path for the vehicle using at least one less planning constraint than the primary control system.

In Example 9, the method of any of Examples 1-8 can optionally include where the determining the alternative action for the vehicle includes computing an alternative path for the vehicle based on a free space in a geographical area of the vehicle.

In Example 10, the method of any of Examples 1-9 can optionally include where the free space for computing the alternative path for the vehicle is independent of any lane limitation.

In Example 11, the method of any of Examples 1-10 can optionally include where the computing the alternative path for the vehicle is further based on an occupancy grid map including an indication of the free space.

In Example 12, the method of any of Examples 1-11 can optionally include where the computing the alternative path for the vehicle is further based on motion information associated with a tracked object in the occupancy grid map.

Example 13 includes a method including determining, by a primary planner of a vehicle, a first action for the vehicle using a first process; determining, by a fallback planner of the vehicle independent of the primary planner, an alternative action for the vehicle using a second process nonoverlapping with the first process, where the alternative action includes at least stopping the vehicle; sending, to an actuator system of the vehicle, a control parameter for performing the alternative action responsive to a faulty condition associated with the primary planner; and computing, by the fallback planner, a collision-free path for the vehicle responsive to a determination of an area at which the vehicle stopped after performing the alternative action fails to satisfy one or more area criteria.

In Example 14, the method of claim 13 can optionally include where the computing the collision-free path for the vehicle includes determining candidate exit roads, each including one or more exit lanes; filtering the exit lanes of the candidate exit roads based on one or more exit criteria; and selecting a first exit lane from the filtered exit lanes based at least in part on a distance between a location of the vehicle and the first exit lane.

In Example 15, the method of any of Examples 13-14 can optionally include where the computing the collision-free path for the vehicle further includes determining whether a path from the location of the vehicle to the first exit lane is statically and dynamically collision-free.

In Example 16, the method of any of Examples 13-15 can optionally include where the first process used by the primary planner for determining the first action is based on a non-convex solver; and the second process used by the secondary planner for determining the alternative action is based on a free space planner.

In Example 17, the method of any of Examples 13-16 can optionally include where the computing the collision-free path is further based on free space planning, and where the free space planning is based on an occupancy grid map including an indication of one or more free spaces; and motion information associated with one or more tracked objects in the occupancy grid map.

In Example 18, the method of any of Examples 13-17 can optionally include determining the area at which the vehicle stopped fails to satisfy the one or more criteria based on the area being associated with at least one of an intersection, an oncoming traffic lane, or an emergency driveway.

In Example 19, the method of any of Examples 13-18 can optionally include sending, to the actuator system of the vehicle, a second control parameter based on the collision-free path.

In Example 20, the method of any of Examples 13-19 can optionally include where the determining the alternative action by the fallback planner is performed concurrently with the determining the first action by the primary planner.

Example 21 includes a vehicle including a primary control system to determine a first action for the vehicle based on first sensor data associated with an environment outside of the vehicle; a fallback control system to determine, independent of the primary control system, an alternative action for the vehicle based on second sensor data associated with the environment using at least one of a different perception process, a different prediction process, or a different planning process than the primary control system; and a path multiplexer to switch a control of the vehicle from the primary control system to the fallback control system responsive to a faulty condition associated with the primary control system by generating a first control command based on the alternative action.

In Example 22, the vehicle of Example 21 can optionally include where the second sensor data used by the fallback control system to determine the alternative action is a subset of the first sensor data used by the primary control system to determine first action, where the subset is less than all of the first sensor data.

In Example 23, the vehicle of any of Examples 21-22 can optionally include where the second sensor data used by the fallback control system to determine the alternative action is separate from the first sensor data used by the primary controls system to determine the first action.

In Example 24, the vehicle of any of Examples 21-23 can optionally include one or more first sensors to generate the first sensor data for the primary control system to determine the first action; and one or more second sensors, separate from the one or more first sensors, to generate the second sensor data for the fallback control system to determine the alternative action.

In Example 25, the vehicle of any of Examples 21-24 can optionally include where all of the one or more second sensors are LIDAR sensors.

In Example 26, the vehicle of any of Examples 21-25 can optionally include where the primary control system determines the first action further using machine learning; and the fallback control system determines the alternative action using heuristic-based rules.

In Example 27, the vehicle of any of Examples 21-26 can optionally include where the primary control system determines the first action by computing a first path for the vehicle based on a first set of constraints; and the fallback control system determines the alternative action for the vehicle by computing a second path for the vehicle based on a second set of constraints different from the first set of constraints.

In Example 28, the vehicle of any of Examples 21-27 can optionally include where the alternative action includes at least stopping the vehicle; and the fallback control system further computes a collision-free path for the vehicle responsive to a detection of an area at which the vehicle stopped after performing the alternative action fails to satisfy one or more area criteria.

In Example 29, the vehicle of any of Examples 21-28 can optionally include where the primary control system determines the first action by selecting the first action from a full set of candidate actions; and the fallback control system determines the alternative action by selecting the alternative action from a reduced set of candidate actions.

In Example 30, the vehicle of any of Examples 21-29 can optionally include where the fallback control system includes at least one processing component separate from the fallback control system.

In Example 31, the vehicle of any of Examples 21-30 can optionally include where the vehicle is an autonomous vehicle.

Variations and Implementations

As will be appreciated by one skilled in the art, aspects of the present disclosure, in particular, aspects of using the generator model to add elements to and/or modify elements in a scene and using the discriminator model to classify an object from a scene, described herein, can be embodied in various manners (e.g., as a method, a system, a computer program product, or a computer-readable storage medium). Accordingly, aspects of the present disclosure can take the form of a hardware implementation, a software implementation (including firmware, resident software, or microcode) or an implementation combining software and hardware aspects that can generally be referred to herein as a "circuit," "module" or "system." Functions described in this disclosure can be implemented as an algorithm executed by one or more hardware processing units, e.g. one or more microprocessors of one or more computers. In various embodiments, different steps and portions of the operations of the methods described herein can be performed by different processing units. Furthermore, aspects of the present disclosure can take the form of a computer program product embodied in one or more computer-readable media having computer-readable program code embodied, e.g., stored or encoded, thereon. In various embodiments, such a computer program can, for example, be downloaded (or updated) to the existing devices and systems or be stored upon manufacturing of these devices and systems.

The foregoing disclosure presents various descriptions of certain specific embodiments. The innovations described herein can be embodied in a multitude of different ways, for example, as defined and covered by the claims and/or select examples. In the following description, reference is made to the drawings where like reference numerals can indicate identical or functionally similar elements. Elements illustrated in the drawings are not necessarily drawn to scale. Additionally, certain embodiments can include more elements than illustrated in a drawing and/or a subset of the elements illustrated in a drawing. Further, some embodiments can incorporate any suitable combination of features from two or more drawings.

The foregoing disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. Numerous implementation-specific decisions might be made to achieve the developer's specific goals, including compliance with system, business, and/or legal constraints, which may vary from one implementation to another. Additionally, while such a development effort might be complex and time-consuming; it would be a routine undertaking for those of ordinary skill in the art having the benefit of this disclosure.

In the Specification, reference might be made to spatial relationships between various components and to the spatial orientation of various aspects of components as depicted in the attached drawings. As will be recognized by those skilled in the art after a complete reading of the present disclosure, the devices, components, members, and apparatuses described herein can be positioned in any orientation. Thus, the use of terms such as "above", "below", "upper", "lower", "top", "bottom", or other similar terms to describe a spatial relationship between various components or to describe the spatial orientation of aspects of such components, describe a relative relationship between the components or a spatial orientation of aspects of such components, respectively, as the components described herein can be oriented in any direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the description and the claims. Note that all optional features of the apparatus described above may also be implemented with respect to the method or process described herein and specifics in the examples may be used anywhere in one or more embodiments.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

In addition, the terms "storage media," "computer-readable storage media," or "computer-readable storage medium" can refer to non-transitory storage media, such as a hard drive, a memory chip, and cache memory, and to transitory storage media, such as carrier waves or propagating signals.

Further, the terms "comprise," "comprising," "include," "including," "have," "having" or any other variation thereof, are intended to cover a non-exclusive inclusion. For example, a method, process, device, or system that comprises a list of elements is not necessarily limited to only those elements but may include other elements not expressly listed or inherent to such method, process, device, or system. Also, the term "or" refers to an inclusive or and not to an exclusive or.

In one example embodiment, any number of electrical circuits of the FIGS. can be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.) and computer-readable, non-transitory memory elements can be coupled to the board based on particular configurations, processing demands, or computer designs. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have been offered for purposes of example and teaching. Such information can be varied considerably, as the specifications apply to non-limiting examples. In the foregoing description, example implementations have been described with reference to particular arrangements of components. Various modifications and changes can be made to such implementations. The description and drawings are, accordingly, to be regarded in an illustrative sense and not in a restrictive sense.

With the numerous examples provided herein, interaction may be described in terms of two, three, four, or more electrical components for purposes of clarity and example. The system can be consolidated in any suitable manner. Along similar design alternatives, any of the illustrated components, modules, and elements of the FIGS. can be combined in various possible configurations within the scope of this disclosure. In certain cases, it might be easier to describe one or more of the functionalities of a given set of flows by referencing a limited number of electrical elements. The electrical circuits of the FIGS. and their teachings are readily scalable and can accommodate many components, as well as more complicated/sophisticated arrangements and configurations. Accordingly, the examples provided do not limit the scope or inhibit the teachings of the electrical circuits as potentially applied to a myriad of other architectures.

Note that in this Specification, references to various features (e.g., elements, structures, modules, components, steps, operations, characteristics, etc.) included in "one implementation", "example implementation", "an implementation", "another implementation", "some implementations", "various implementations", "other implementations", "alternative implementation", and the like are intended to mean that any such features are included in one or more implementations of the present disclosure and might not necessarily be combined in the same embodiments.

Note that the functions related to using the generator model to add elements to and/or modify elements in a scene and using the discriminator model to classify an object from a scene, e.g. those summarized in the one or more processes shown in FIGS., illustrate some of the possible functions that can be executed by, or within, the systems illustrated in the FIGS. Some of these operations can be deleted or omitted where appropriate, or these operations can be modified or changed considerably. In addition, the timing of these operations can be altered considerably. The preceding operational flows have been offered for purposes of example and discussion. Implementations described herein provide flexibility, in that any suitable arrangements, chronologies, configurations, and timing mechanisms can be provided.

Numerous other changes, substitutions, variations, alterations, and modifications might be ascertained by one skilled in the art, and the present disclosure encompasses such changes, substitutions, variations, alterations, and modifications as falling within the scope of the appended claims. Optional features of the apparatus described above can be implemented with respect to the method or process described herein and specifics in the examples can be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A method comprising:
    determining, by a primary planner of an autonomous vehicle, a first action for the autonomous vehicle using a first process;
    determining, by a fallback planner of the autonomous vehicle independent of the primary planner, an alternative action for the autonomous vehicle using a second process nonoverlapping with the first process, wherein the alternative action includes at least stopping the autonomous vehicle;
    sending, by a multiplexer of a common control system of the autonomous vehicle, an indication of the alternative action for actuators to use to cause the autonomous vehicle to navigate in response to a faulty condition associated with the primary planner, wherein the faulty condition is the primary planner failing to predict a trajectory for other traffic participants in an environment of the autonomous vehicle; and
    computing, by the fallback planner, a collision-free path for the autonomous vehicle responsive to a determination of an area at which the autonomous vehicle stopped after performing the alternative action fails to satisfy one or more area criteria.

2. The method of claim 1, wherein the computing the collision-free path for the vehicle comprises:
    determining candidate exit roads, each including one or more exit lanes;
    filtering the exit lanes of the candidate exit roads based on one or more exit criteria; and
    selecting a first exit lane from the filtered exit lanes based at least in part on a distance between a location of the vehicle and the first exit lane.

3. The method of claim 2, wherein the computing the collision-free path for the vehicle further comprises:
    determining whether a path from the location of the vehicle to the first exit lane is collision-free.

4. The method of claim 1, wherein:
    the first process used by the primary planner for determining the first action is based on a non-convex solver; and
    the second process used by the fallback planner for determining the alternative action is based on a free space planner.

5. The method of claim 1, wherein the computing the collision-free path is further based on free space planning, and wherein the free space planning is based on:
    an occupancy grid map including an indication of one or more free spaces; and motion information associated with one or more tracked objects in the occupancy grid map.

6. The method of claim 1, further comprising:
determining the area at which the vehicle stopped fails to satisfy the one or more area criteria based on the area being associated with at least one of an intersection, an oncoming traffic lane, or an emergency driveway.

7. The method of claim 1, further comprising:
determining the area at which the vehicle stopped after performing the alternative action fails to satisfy the one or more area criteria,
wherein the one or more area criteria is associated with an imminent collision between the vehicle and an object in the area.

8. The method of claim 1, wherein the determining the alternative action by the fallback planner is performed concurrently with the determining the first action by the primary planner.

* * * * *